(12) United States Patent
Inoue

(10) Patent No.: US 7,929,000 B2
(45) Date of Patent: Apr. 19, 2011

(54) IMAGE DISPLAY DEVICE

(75) Inventor: Akihiko Inoue, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/449,523

(22) PCT Filed: Nov. 30, 2007

(86) PCT No.: PCT/JP2007/073236
§ 371 (c)(1),
(2), (4) Date: Aug. 12, 2009

(87) PCT Pub. No.: WO2008/146424
PCT Pub. Date: Dec. 4, 2008

(65) Prior Publication Data
US 2010/0091042 A1    Apr. 15, 2010

(30) Foreign Application Priority Data
May 28, 2007    (JP) .................. 2007-140571

(51) Int. Cl.
*G09G 5/10* (2006.01)
(52) U.S. Cl. .......................................... 345/690; 345/89
(58) Field of Classification Search .................. 345/690, 345/208, 87, 89, 94
See application file for complete search history.

(56) References Cited

U.S. PATENT DOCUMENTS

| 2004/0201564 | A1 | 10/2004 | Sugino et al. |
| 2005/0122295 | A1 | 6/2005 | Sawabe |
| 2005/0162360 | A1 | 7/2005 | Ishihara et al. |
| 2005/0253785 | A1 | 11/2005 | Miyasaka et al. |
| 2006/0256141 | A1 | 11/2006 | Maruyama et al. |
| 2009/0122207 | A1 | 5/2009 | Inoue et al. |

FOREIGN PATENT DOCUMENTS

| JP | 2650479 | 5/1997 |
| JP | 9-325715 | 12/1997 |
| JP | 2001-042831 | 2/2001 |
| JP | 2003-208138 | 7/2003 |
| JP | 2004-233949 | 8/2004 |
| JP | 2005-091454 | 4/2005 |
| JP | 2005-173387 | 6/2005 |
| JP | 2005-173573 | 6/2005 |
| JP | 2005-189820 | 7/2005 |
| JP | 2006-343707 | 12/2006 |
| WO | WO 2006/100988 | 9/2006 |
| WO | WO 2007/018219 | 2/2007 |

*Primary Examiner* — Ricardo L Osorio
(74) *Attorney, Agent, or Firm* — Harness, Dickey & Pierce, P.L.C.

(57) ABSTRACT

In one embodiment of the present invention, a frame interpolation process circuit performs an interpolation process on a video signal in units of frames. A time-division gradation process circuit performs gradation level conversion for distributing brightness for one frame cycle to two sub-frame cycles, i.e., first and second sub-frame cycles. A gradation level change detection circuit detects whether a gradation level of each pixel has changed between consecutive sub-frames. For any pixel having its gradation level changed, an overshoot process circuit outputs, instead of an output signal of the time-division gradation process circuit, a video signal obtained by subjecting an output signal of the frame interpolation process circuit to gradation level conversion for emphasizing a temporal change of the signal. A predetermined-times higher speed process circuit may be added to this circuit configuration, or may be substituted for the frame interpolation process circuit. This makes it possible to improve moving image display performance, while making up for a lack of response speed of display elements.

17 Claims, 26 Drawing Sheets

Fig. 7

DISPLAY POSITION (PIXEL) →

| 13 | 13 | 13 | 0 | 0 | 0 | 0 | 0 | 0 | 0 | 0 | 0 | 0 | 0 | 0 |
|---|---|---|---|---|---|---|---|---|---|---|---|---|---|---|
| 239 | 239 | 239 | 239 | 0 | 0 | 0 | 0 | 0 | 0 | 0 | 0 | 0 | 0 | 0 |
| 13 | 13 | 13 | 13 | 13 | 0 | 0 | 0 | 0 | 0 | 0 | 0 | 0 | 0 | 0 |
| 239 | 239 | 239 | 239 | 239 | 239 | 0 | 0 | 0 | 0 | 0 | 0 | 0 | 0 | 0 |
| 13 | 13 | 13 | 13 | 13 | 13 | 13 | 0 | 0 | 0 | 0 | 0 | 0 | 0 | 0 |
| 239 | 239 | 239 | 239 | 239 | 239 | 239 | 239 | 0 | 0 | 0 | 0 | 0 | 0 | 0 |
| 13 | 13 | 13 | 13 | 13 | 13 | 13 | 13 | 13 | 0 | 0 | 0 | 0 | 0 | 0 |
| 239 | 239 | 239 | 239 | 239 | 239 | 239 | 239 | 239 | 239 | 0 | 0 | 0 | 0 | 0 |
| 13 | 13 | 13 | 13 | 13 | 13 | 13 | 13 | 13 | 13 | 13 | 0 | 0 | 0 | 0 |
| 239 | 239 | 239 | 239 | 239 | 239 | 236 | 239 | 239 | 239 | 239 | 239 | 0 | 0 | 0 |
| 13 | 13 | 13 | 13 | 13 | 13 | 13 | 13 | 13 | 13 | 13 | 13 | 13 | 0 | 0 |
| 239 | 239 | 239 | 239 | 239 | 239 | 239 | 239 | 239 | 239 | 239 | 239 | 239 | 239 | 0 |

First / Second → ONE SUB-FRAME CYCLE

TIME ↓

PIXEL OF INTEREST

Fig. 8

DISPLAY POSITION (PIXEL) →

| 13 | 13 | 127 | 0 | 0 | 0 | 0 | 0 | 0 | 0 | 0 | 0 | 0 | 0 | 0 |
|---|---|---|---|---|---|---|---|---|---|---|---|---|---|---|
| 239 | 239 | 239 | 245 | 0 | 0 | 0 | 0 | 0 | 0 | 0 | 0 | 0 | 0 | 0 |
| 13 | 13 | 13 | 13 | 127 | 0 | 0 | 0 | 0 | 0 | 0 | 0 | 0 | 0 | 0 |
| 239 | 239 | 239 | 239 | 239 | 245 | 0 | 0 | 0 | 0 | 0 | 0 | 0 | 0 | 0 |
| 13 | 13 | 13 | 13 | 13 | 13 | 127 | 0 | 0 | 0 | 0 | 0 | 0 | 0 | 0 |
| 239 | 239 | 239 | 239 | 239 | 239 | 239 | 245 | 0 | 0 | 0 | 0 | 0 | 0 | 0 |
| 13 | 13 | 13 | 13 | 13 | 13 | 13 | 13 | 127 | 0 | 0 | 0 | 0 | 0 | 0 |
| 239 | 239 | 239 | 239 | 239 | 239 | 239 | 239 | 239 | 245 | 0 | 0 | 0 | 0 | 0 |
| 13 | 13 | 13 | 13 | 13 | 13 | 13 | 13 | 13 | 13 | 127 | 0 | 0 | 0 | 0 |
| 239 | 239 | 239 | 239 | 239 | 239 | 236 | 239 | 239 | 239 | 239 | 245 | 0 | 0 | 0 |
| 13 | 13 | 13 | 13 | 13 | 13 | 13 | 13 | 13 | 13 | 13 | 127 | 0 | 0 | 0 |
| 239 | 239 | 239 | 239 | 239 | 239 | 239 | 239 | 239 | 239 | 239 | 239 | 245 | 0 | 0 |

First / Second → ONE SUB-FRAME CYCLE

TIME ↓

PIXEL OF INTEREST

IMAGE DISPLAY DEVICE

TECHNICAL FIELD

The present invention relates to image display devices, such as liquid crystal display devices and electroluminescence display devices.

BACKGROUND ART

Image display devices, such as liquid crystal display devices, are disadvantageous in that, when displaying a moving image, boundaries with different display brightness are visually perceived as blurry. Such a deterioration in moving image display performance is due to the following two factors. The first factor is that display elements have a response speed slower than a speed corresponding to one frame cycle of video. A known technology for making up for such a lack of response speed of the display elements is overshoot drive (also referred to as "overdrive"). Overshoot drive is a method for forcibly driving display elements at high speed by applying voltage higher or lower than voltage for achieving a desired gradation level, in accordance with the direction in which the gradation level of a video signal changes (increases or decreases). Overshoot drive is disclosed in, for example, Patent Document 1.

The second factor is that hold-type display elements are used for keeping brightness at an approximately constant level over one frame cycle of video. Concerning this point, Patent Document 2 describes that, in the case of an image display device provided with hold-type display elements, when displaying a moving image, the moving image might appear blurry due to the viewer's following line of sight. To prevent such a moving image blur, the hold time of the display elements is required to be shortened, and specific methods known for this are frame interpolation drive for shortening the length of one frame cycle of video, and time-division gradation drive (pseudo-impulse drive) for approximation to impulse-type light emission as in CRTs. Frame interpolation drive using motion vectors is disclosed in, for example, Patent Document 3, and time-division gradation drive is disclosed in, for example, Patent Document 4.

In addition, Patent Document 5 discloses a drive mode combining frame interpolation drive in which a frame for compensating for motion of an object image is created and interposed between frames to achieve an increased refresh rate, and overdrive. In this drive mode, an overdrive correction circuit is disposed at the subsequent stage of a frame converter circuit. The frame converter circuit suppresses occurrence of any moving image blur due to the viewer's following line of sight, while the overdrive correction circuit makes up for the lack of response speed of the liquid crystal display elements, which improves moving image display performance. Furthermore, Patent Document 6 also discloses a drive mode using a combination of frame interpolation drive and overdrive.

[Patent Document 1] Japanese Patent No. 2650479
[Patent Document 2] Japanese Laid-Open Patent Publication No. 9-325715
[Patent Document 3] Japanese Laid-Open Patent Publication No. 2001-42831
[Patent Document 4] Japanese Laid-Open Patent Publication No. 2005-173573
[Patent Document 5] Japanese Laid-Open Patent Publication No. 2005-91454
[Patent Document 6] Japanese Laid-Open Patent Publication No. 2005-189820

DISCLOSURE OF THE INVENTION

Problems to be Solved by the Invention

As mentioned above, although Patent Documents 5 and 6 disclose methods for improving moving image display performance using frame interpolation drive and overshoot drive, these methods are not applicable to image display devices performing time-division gradation drive. Therefore, when attempting to improve moving image display performance of image display devices with display elements having a slow response speed by suppressing occurrence of any moving image blur due to the viewer's following line of sight via time-division gradation drive, a new problem arises where false contours appear on the screen.

Referring to FIGS. 30 to 32, the cause of the appearance of false contours will be described. An image display device in which brightness is distributed to two sub-frames obtained by halving one frame cycle of video into first and second portions, such that the sum of time integration values of brightness for the two sub-frames is equal to brightness for one frame cycle, is taken as an example of the image display device performing time-division gradation drive. However, it should be noted that brightness is preferentially distributed to the second sub-frame, and the first sub-frame has brightness distributed thereto only when the maximum brightness is distributed to the second sub-frame.

A case is considered where the gradation level of a video signal provided to fifteen horizontally neighboring pixels (display elements) in this image display device changes as shown in FIG. 30. FIG. 30 shows a gradation level change over six frame cycles of the video signal provided to the fifteen pixels horizontally neighboring across the boundary between two regions displayed on the screen, one being a region where the gradation level is 0 during the first sub-frame and 255 during the second sub-frame, the other being a region where the gradation level is 0 during both the first and second sub-frames, the boundary moving horizontally rightward at a rate of two pixels per frame.

In this case, if the display elements have a response speed slower than a speed corresponding to one sub-frame cycle of video, brightness of a pixel of interest shown in FIG. 30 changes, for example, as shown in FIG. 31. Note that brightness shown in FIG. 31 is the value converted to the gradation level in hold-type display. Brightness of the pixel of interest is controlled to be 0 during the first sub-frame and 255 during the second sub-frame in the third and subsequent frames. However, in reality, the display elements have a response speed slower than a speed corresponding to one sub-frame cycle, and therefore brightness of the pixel of interest only reaches 0 and 239 during the first and second sub-frames, respectively, in the third frame, and 13 and 243 during the first and second sub-frames, respectively, in the fourth and subsequent frames. Therefore, pixels around the boundary may vary from other pixels in terms of the minimum brightness during the first sub-frame and the maximum brightness during the second sub-frame.

The viewer visually perceives the boundary which exhibits the brightness response waveform shown in FIG. 31, while temporally integrating display brightness along movement of the line of sight. As a result, the viewer sees brightness around the boundary as shown in FIG. 32. The time integration value for brightness changes in accordance with the horizontal display position as shown in FIG. 32, but there is a point (inflection point) with a small amount of change in time integration value for brightness, and therefore, there appear before and after the inflection point, two points with a large amount of change in time integration value for brightness. The points with a large amount of change in time integration value for brightness are recognized as contours, and in this case, the viewer visually perceives two contours (first and second contours) which are true and false contours, respectively.

Therefore, an objective of the present invention is to provide an image display device capable of improving moving image display performance, while making up for a lack of response speed of display elements.

Solution to the Problems

A first aspect of the present invention is directed to an image display device for providing a gradation display based on a video signal, comprising: a plurality of display elements; a drive circuit for driving the display elements; a video conversion circuit for obtaining a video signal in units of sub-frames based on a video signal inputted in units of frames; a time-division gradation process circuit for performing gradation level conversion on a video signal outputted from the video conversion circuit to distribute brightness for one frame cycle to a plurality of sub-frame cycles; a gradation level change detection circuit for detecting whether a gradation level of each pixel has been changed between consecutive sub-frames for the video signal outputted from the video conversion circuit; and an overshoot process circuit for outputting to the drive circuit a video signal obtained by subjecting a video signal outputted from the video conversion circuit to gradation level conversion, instead of a video signal outputted from the time-division gradation process circuit, regarding any pixel detected by the gradation level change detection circuit to have its gradation level changed, the gradation level conversion being performed in order to distribute brightness for one frame cycle to a plurality of sub-frame cycles while emphasizing a temporal change of the signal.

In a second aspect of the present invention, based on the first aspect of the invention, the video conversion circuit includes a frame interpolation process circuit for performing an interpolation process on the input video signal in units of frames.

In a third aspect of the present invention, based on the first aspect of the invention, the video conversion circuit includes a predetermined-times higher speed process circuit for outputting the input video signal a plurality of times in units of frames.

In a fourth aspect of the present invention, based on the first aspect of the invention, the video conversion circuit includes: a frame interpolation process circuit for performing an interpolation process on the input video signal in units of frames; and a predetermined-times higher speed process circuit for outputting a video signal outputted from the frame interpolation process circuit a plurality of times in units of frames.

In a fifth aspect of the present invention, based on any of the first through fourth aspects of the invention, the video conversion circuit includes one or more video processing circuits for processing the video signal, the video processing circuit and the time-division gradation process circuit switch between processing and not processing the video signal in accordance with a control signal, and the overshoot process circuit performs a different type of gradation level conversion in accordance with the control signal.

In a sixth aspect of the present invention, based on the first aspect of the invention, the overshoot process circuit performs gradation level conversion differently on each sub-frame within one frame.

In a seventh aspect of the present invention, based on the sixth aspect of the invention, the gradation level change detection circuit outputs a signal indicating for each pixel whether a gradation level has changed between consecutive sub-frames by a predetermined value or more.

In an eighth aspect of the present invention, based on the sixth aspect of the invention, the overshoot process circuit includes a look-up table and an arithmetic circuit, the look-up table having stored therein a post-conversion gradation level corresponding to a representative value, the arithmetic circuit calculating a post-conversion gradation level corresponding to a value other than the representative value.

In a ninth aspect of the present invention, based on the eighth aspect of the invention, the overshoot process circuit performs processes on the video signal outputted from the video conversion circuit in order to distribute brightness for one cycle to two sub-frame cycles, one of the processes being performed for a gradation level below a predetermined value to achieve a constant post-conversion gradation level for the first sub-frame and a variable post-conversion gradation level for the second sub-frame, the other being performed for a gradation level at or above the predetermined value to achieve a constant post-conversion gradation level for the second sub-frame and a variable post-conversion gradation level for the first sub-frame, and the representative value includes a gradation level at a boundary for switching between the two processes.

In a tenth aspect of the present invention, based on the sixth aspect of the invention, where maximum reachable brightness value signifies brightness of the display elements after one sub-frame cycle since a gradation level of a video signal provided to the display elements changed from minimum to maximum, and minimum reachable brightness value signifies brightness of the display elements after one sub-frame cycle since the gradation level of the video signal provided to the display elements changed from maximum to minimum, the time-division gradation process circuit outputs a value between the minimum reachable brightness value and the maximum reachable brightness value as a post-conversion gradation level when a gradation level of the video signal outputted from the video conversion circuit is between the minimum reachable brightness value and the maximum reachable brightness value.

In an eleventh aspect of the present invention, based on the tenth aspect of the invention, the time-division gradation process circuit outputs a pre-conversion gradation level as the post-conversion gradation level when the gradation level of the video signal outputted from the video conversion circuit is less than the minimum reachable brightness value or greater than the maximum reachable brightness value.

In a twelfth aspect of the present invention, based on the sixth aspect of the invention, the display elements have a response speed slower than a speed corresponding to one sub-frame cycle.

In a thirteenth aspect of the present invention, based on the twelfth aspect of the invention, the display elements are liquid crystal display elements.

In a fourteenth aspect of the present invention, based on the twelfth aspect of the invention, the display elements are electroluminescence elements.

EFFECT OF THE INVENTION

According to the first aspect of the present invention, a time-division gradation process is performed on a video signal in units of sub-frames obtained by the video conversion circuit, and an overshoot process is performed for pixels having their gradation levels changed between sub-frames. Accordingly, by suppressing occurrence of any moving image blur via time-division gradation drive, and making up for a lack of response speed of display elements via overshoot drive, it becomes possible to improve moving image display performance, while making up for the lack of response speed of the display elements.

According to the second aspect of the present invention, a frame interpolation process is performed on an input video signal to obtain a video signal in units of sub-frames. Accordingly, by suppressing occurrence of any moving image blur via frame interpolation drive and time-division gradation drive, and making up for a lack of response speed of the display elements via overshoot drive, it becomes possible to improve moving image display performance, while making up for the lack of response speed of the display elements.

According to the third aspect of the present invention, a predetermined-times higher speed process is performed on an input video signal to obtain a video signal in units of sub-frames. Accordingly, by suppressing occurrence of any moving image blur via time-division gradation drive, and making up for a lack of response speed of the display elements via overshoot drive, it becomes possible to improve moving image display performance, while making up for the lack of response speed of the display elements.

According to the fourth aspect of the present invention, a frame interpolation process and a predetermined-times higher speed process are performed on an input video signal to obtain a video signal in units of sub-frames. Accordingly, by suppressing occurrence of any moving image blur via frame interpolation drive and time-division gradation drive, and making up for a lack of response speed of the display elements via overshoot drive, it becomes possible to improve moving image display performance, while making up for the lack of response speed of the display elements.

According to the fifth aspect of the present invention, by selectively operating the video processing circuit and the time-division gradation process circuit using a control signal, it is possible to switch between modes of driving the display elements. In addition, the overshoot process circuit is provided for performing a different type of gradation level conversion in accordance with the control signal, and therefore it is possible to eliminate the need to provide an overshoot process circuit for each drive mode, resulting in a reduction in the cost of the image display device.

According to the sixth aspect of the present invention, by suppressing occurrence of any moving image blur via time-division gradation drive, and performing appropriate overshoot drive for each sub-frame, it becomes possible to improve moving image display performance, while making up for the lack of response speed of the display elements for each sub-frame.

According to the seventh aspect of the present invention, by performing gradation level conversion via the overshoot process circuit only for pixels having their gradation levels changed between consecutive sub-frames by a predetermined value or more, it becomes possible to prevent any false operation due to noise contamination.

According to the eighth aspect of the present invention, a post-conversion gradation level corresponding to a representative value is read from a look-up table so that a post-conversion gradation level corresponding to a value other than the representative value can be calculated via interpolation computation by the arithmetic circuit. Accordingly, it is possible to reduce storage capacity of the look-up table and change the accuracy of the overshoot process as necessary.

According to the ninth aspect of the present invention, even when characteristics of gradation level conversion discontinuously change at a boundary gradation level, by storing a post-conversion value to the look-up table in association with a boundary level, it becomes possible to improve moving image display performance by reducing error generated when gradation level conversion is arithmetically performed for a gradation level close to the boundary level, while appropriately making up for a lack of response speed of the display elements.

According to the tenth aspect of the present invention, when the gradation level of a video signal outputted from the video conversion circuit lies between the minimum reachable brightness value and the maximum reachable brightness value, by performing impulse drive while making up for a lack of response speed of the display elements via the overshoot process circuit, it becomes possible to improve moving image display performance without two contours being visually perceived.

According to the eleventh aspect of the present invention, even when the gradation level of a video signal outputted from the video conversion circuit does not lie between the minimum reachable brightness value and the maximum reachable brightness value, it is possible to improve moving image display performance without two contours being visually perceived.

According to the twelfth aspect of the present invention, even when the display elements have a response speed slower than a speed corresponding to one sub-frame cycle, by suppressing occurrence of any moving image blur via time-division gradation drive and making up for a lack of response speed of the display elements via overshoot drive, it becomes possible to improve moving image display performance, while making up for the lack of response speed of the display elements.

According to the thirteenth aspect of the present invention, it is possible to provide a liquid crystal display device capable of improving moving image display performance, while making up for a lack of response speed of the display elements.

According to the fourteenth aspect of the present invention, it is possible to provide an electroluminescence display device capable of improving moving image display performance, while making up for a lack of response speed of the display elements.

BRIEF DESCRIPTION OF THE DRAWINGS

FIG. 7 is a diagram illustrating an exemplary change of an output signal of a time-division gradation process circuit in the liquid crystal display device shown in FIG. 1.

FIG. 8 is a diagram illustrating an exemplary change of an output signal of an overshoot process circuit in the liquid crystal display device shown in FIG. 1.

Figure 1:
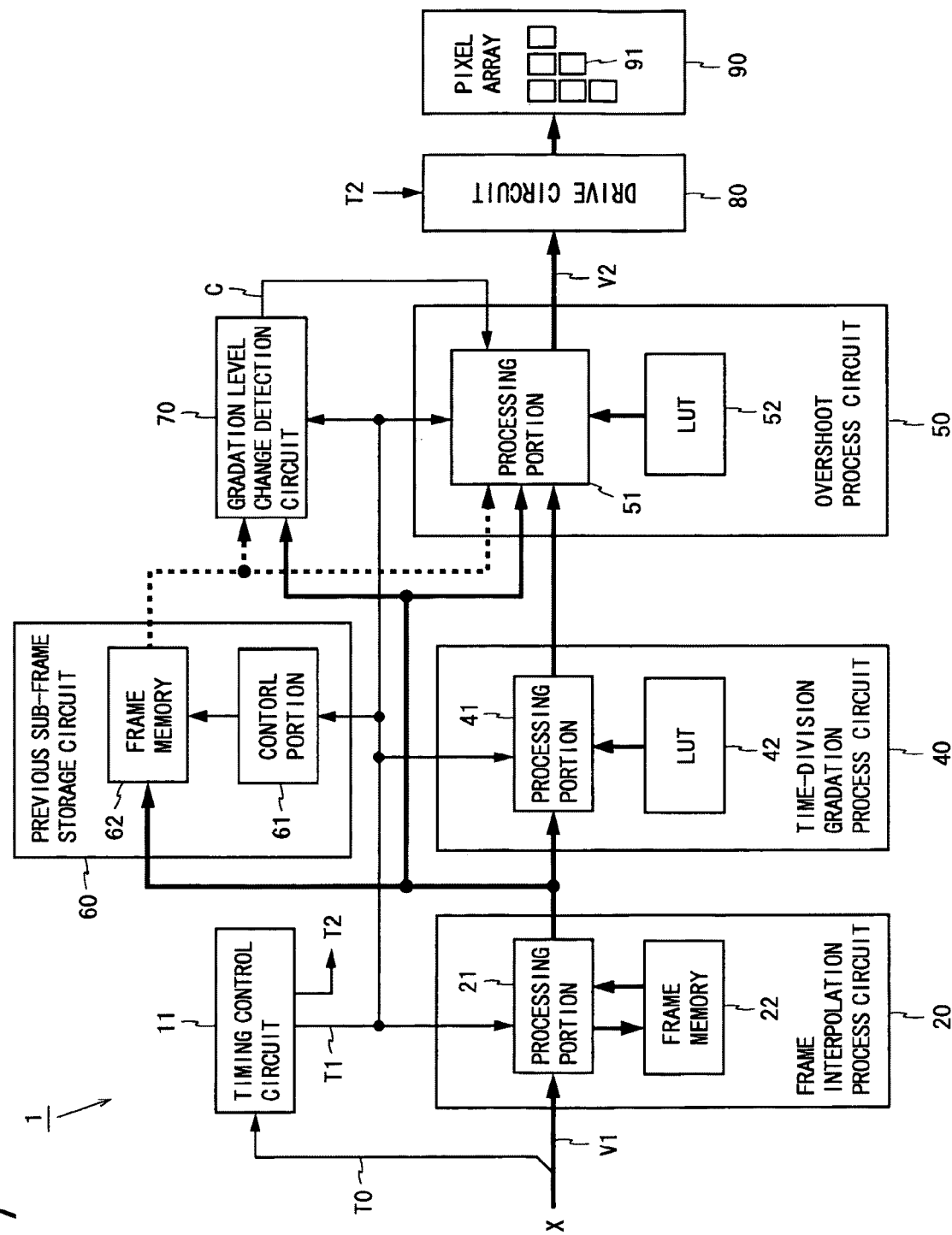
FIG. 1 is a block diagram illustrating the configuration of a liquid crystal display device according to a first embodiment of the present invention.

DESCRIPTION OF THE REFERENCE CHARACTERS 1, 2, 3, 4 liquid crystal display device
11, 12, 13 timing control circuit
20, 25 frame interpolation process circuit
21, 26, 31, 36, 41, 46, 51, 56 processing portion
22, 32, 62 frame memory
30, 35 simple double-speed process circuit
40, 45 time-division gradation process circuit
42, 52 LUT
50, 55 overshoot process circuit
60 previous sub-frame storage circuit
61 control portion
70 gradation level change detection circuit
80 drive circuit
90 pixel array
91 liquid crystal display element

BEST MODE FOR CARRYING OUT THE INVENTION

First Embodiment

FIG. 1 is a block diagram illustrating the configuration of a liquid crystal display device 1 according to a first embodiment of the present invention. The liquid crystal display device 1 shown in FIG. 1 includes a timing control circuit 11, a frame interpolation process circuit 20, a time-division gradation process circuit 40, an overshoot process circuit 50, a previous sub-frame storage circuit 60, a gradation level change detection circuit 70, a drive circuit 80, and a pixel array 90. The liquid crystal display device 1 performs three processes (a frame interpolation process, a time-division gradation process, and an overshoot process) on a video signal V1, and provides a gradation display using a resultant video signal V2. In the present embodiment, the frame interpolation process circuit 20 constitutes a video conversion circuit for obtaining a video signal in units of sub-frames based on a video signal inputted in units of frames.

An input signal X to be supplied to the liquid crystal display device 1 includes the video signal V1 representing image data, and a synchronization signal T0 for setting display timing. The video signal V1 is inputted to the frame interpolation process circuit 20, whereas the synchronization signal T0 is inputted to the timing control circuit 11. Based on the synchronization signal T0, the timing control circuit 11 outputs a synchronization signal T1 to the frame interpolation process circuit 20, the time-division gradation process circuit 40, the overshoot process circuit 50, the previous sub-frame storage circuit 60, and the gradation level change detection circuit 70, while outputting a synchronization signal T2 to the drive circuit 80. The pixel array 90 includes a plurality of liquid crystal display elements 91, which are arranged two-dimensionally. The drive circuit 80 drives the liquid crystal display elements 91 based on the synchronization signal T2, and the video signal V2 outputted from the overshoot process circuit 50. As a result, the liquid crystal display device 1 displays a screen.

Hereinafter, it is assumed that the video signals V1 and V2 are eight-bit signals each representing a gradation level from 0 to 255, and brightness of the liquid crystal display elements 91 is minimized when the gradation level is 0, and maximized when the gradation level is 255. Also, in the liquid crystal display device 1, the video signal V1 has a refresh rate of 60 Hz.

The frame interpolation process circuit 20 includes a processing portion 21 and a frame memory 22, and performs an interpolation process on the video signal V1 in units of frames. More specifically, the frame memory 22 has a capacity capable of memorizing a video signal for at least one frame, and the video signal V1 inputted to the frame interpolation process circuit 20 is written onto the frame memory 22. The processing portion 21 detects a moving image portion from two frames, here, the video signal V1 being the current frame and the video signal stored in the frame memory 22 being the previous frame. The processing portion 21 then obtains the position of the moving image portion at a time point between the previous frame and the current frame, and interposes an interpolation frame, which is a frame (motion-compensated frame) with the moving image portion being moved to the obtained position, between the previous frame and the current frame. As a result, a video signal to be outputted from the frame interpolation process circuit 20 has twice (120 Hz) the refresh rate of the video signal V1.

Figure 2:
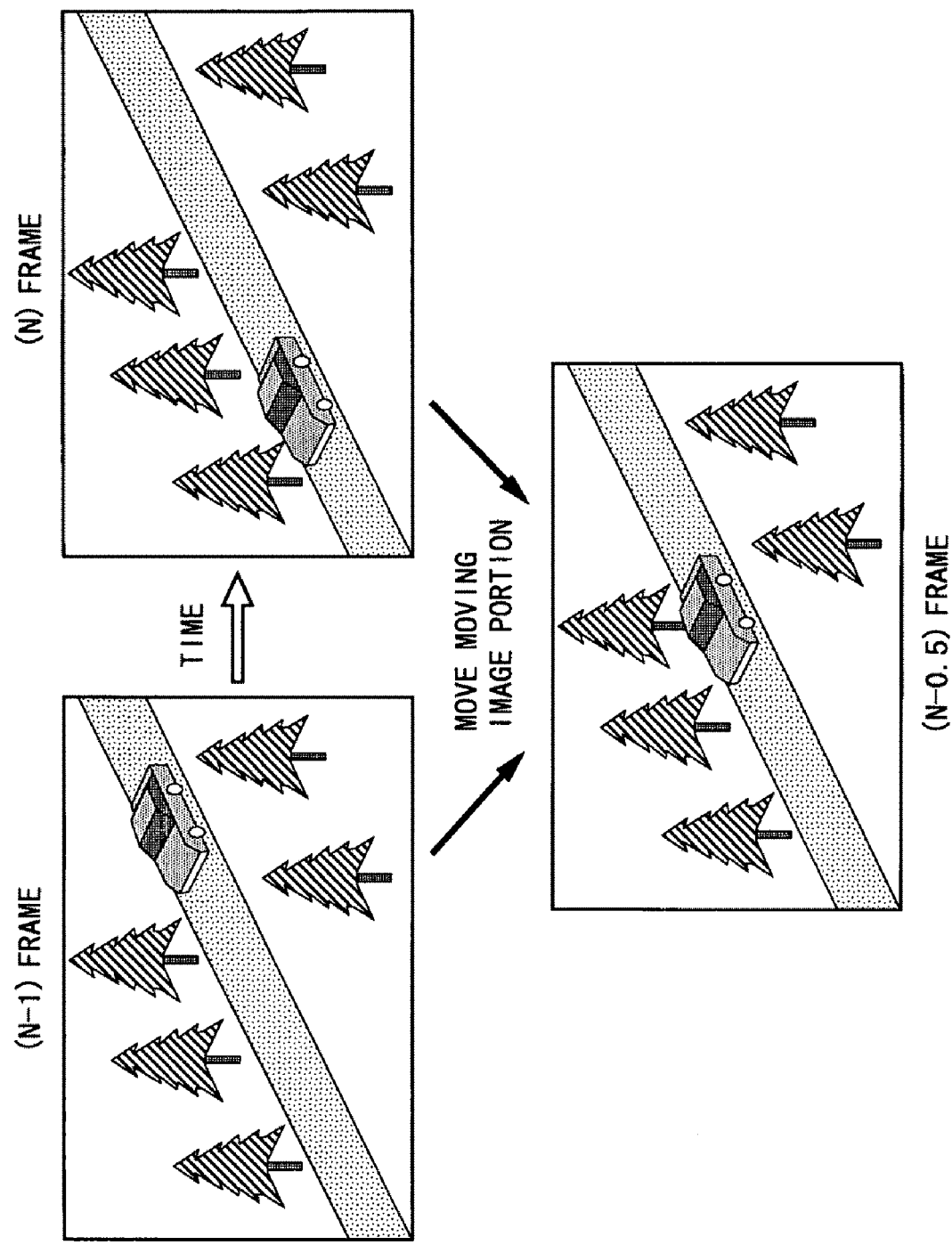
FIG. 2 is a diagram for explaining a frame interpolation process in the liquid crystal display device shown in FIG. 1.

FIG. 2 is a diagram for explaining the frame interpolation process by the frame interpolation process circuit 20. When the video signal V1 includes a series of frames (N−1) and (N), the frame interpolation process circuit 20 performs the following process to create a frame (hereinafter, referred to as a "frame (N−0.5)") at a time point between the two frames. The frame interpolation process circuit 20 first detects a moving image portion (in FIG. 2, an image of a car) from the frames (N−1) and (N). The frame interpolation process circuit 20 then obtains the position of the moving image portion in the frame (N−0.5) based on the positions of the moving image portion in the frames (N−1) and (N). Next, the frame interpolation process circuit 20 creates the frame (N−0.5) by moving the moving image portion to the obtained position. The obtained frame (N−0.5) is interposed between the frames (N−1) and (N).

The time-division gradation process circuit 40 includes a processing portion 41 and a lookup table (hereinafter, referred to as an "LUT") 42, and performs gradation level conversion on the video signal outputted from the frame interpolation process circuit 20 in order to distribute brightness for one frame cycle to two sub-frame cycles, i.e., the first and second sub-frame cycles. In the time-division gradation process circuit 40, the gradation level conversion is performed for distributing the brightness to the two sub-frames such that the sum of time integration values for brightness of the first and second sub-frames is equalized with the brightness for one frame cycle. At this time, the brightness is preferentially distributed to the second sub-frame, and the first sub-frame has the brightness distributed thereto only when the brightness is distributed to the second sub-frame to some substantial extent. As such, by preferentially distributing the brightness to one of sub-frames, it becomes possible to perform pseudo-impulse drive.

The LUT 42 has previously stored therein gradation levels for the first and second sub-frames in association with pre-distribution gradation levels. The gradation levels for the first and second sub-frames are determined so as to satisfy the above conditions (i.e., the sum of the time integration values for brightness of the first and second sub-frames is equalized with brightness for one frame cycle, and the brightness is preferentially distributed to the second sub-frame). The processing portion 41 treats the gradation level of the video signal outputted from the frame interpolation process circuit 20 as a pre-distribution gradation level, and uses this value and information indicating either the first or second sub-frame to refer the LUT 42. In this manner, the processing portion 41 uses the LUT 42 to perform gradation level conversion for distributing the brightness for one frame cycle to two sub-frame cycles, i.e., the first and second sub-frame cycles.

The previous sub-frame storage circuit 60 includes a control portion 61 and a frame memory 62, and outputs the video signal outputted from the frame interpolation process circuit 20, after a delay of one sub-frame cycle. The frame memory 62 has a capacity capable of memorizing a video signal for at least one sub-frame, and the control portion 61 controls writing to/reading from the frame memory 62. The video signal outputted from the frame interpolation process circuit 20 is written onto the frame memory 62, and read from the frame memory 62 after one sub-frame cycle. Hereinafter, a video signal outputted from the previous sub-frame storage circuit 60 is referred to as a "previous sub-frame video signal".

The gradation level change detection circuit 70 performs on each pixel a comparison in gradation level between the video signal outputted from the frame interpolation process circuit 20 and the previous sub-frame video signal, and outputs a change detection signal C indicating for each pixel whether or not the gradation level has changed between consecutive sub-frames. The number of bits in the change detection signal C is typically equal to the number of liquid crystal display elements 91 in the pixel array 90. Hereinafter, it is assumed that the gradation level change detection circuit 70 has a threshold, and the change detection signal C is 1 for any pixel with the amount of change in gradation level being equal to or greater than the threshold, and 0 for other pixels.

For any pixel for which a change in gradation level is detected by the gradation level change detection circuit 70, the overshoot process circuit 50 outputs, instead of the video signal outputted from the time-division gradation process circuit 40, a video signal obtained by subjecting the video signal outputted from the frame interpolation process circuit 20 to gradation level conversion for distributing brightness for one frame cycle to a plurality of sub-frame cycles while emphasizing a temporal change of the signal. The video signal V2 outputted from the overshoot process circuit 50 is supplied to the drive circuit 80, and used for driving the liquid crystal display elements 91.

The overshoot process circuit 50 includes a processing portion 51 and an LUT 52 (first and second sub-frame LUTs). The LUT 52 has previously stored therein post-conversion gradation levels in association with combinations of gradation levels for previous and current sub-frames, as well as whether current sub-frame is the first sub-frame or the second sub-frame. For any pixel for which the change detection signal C is 0, the processing portion 51 outputs the gradation level outputted from the time-division gradation process circuit 40 without modification. Also, for any pixel for which the change detection signal C is 1, the processing portion 51 outputs a gradation level being read from the LUT 52 by treating a gradation level of the video signal outputted from the frame interpolation process circuit 20 as a gradation level of the current sub-frame, and referring the LUT 52 based on that value and a gradation level of the previous sub-frame video signal. In this manner, the overshoot process circuit 50 performs gradation level conversion only on pixels for which the change detection signal C is 1 (i.e., pixels having their gradation levels changed). Note that the LUTs 42 and 52 are implemented by, for example, a ROM or suchlike.

Figure 3:
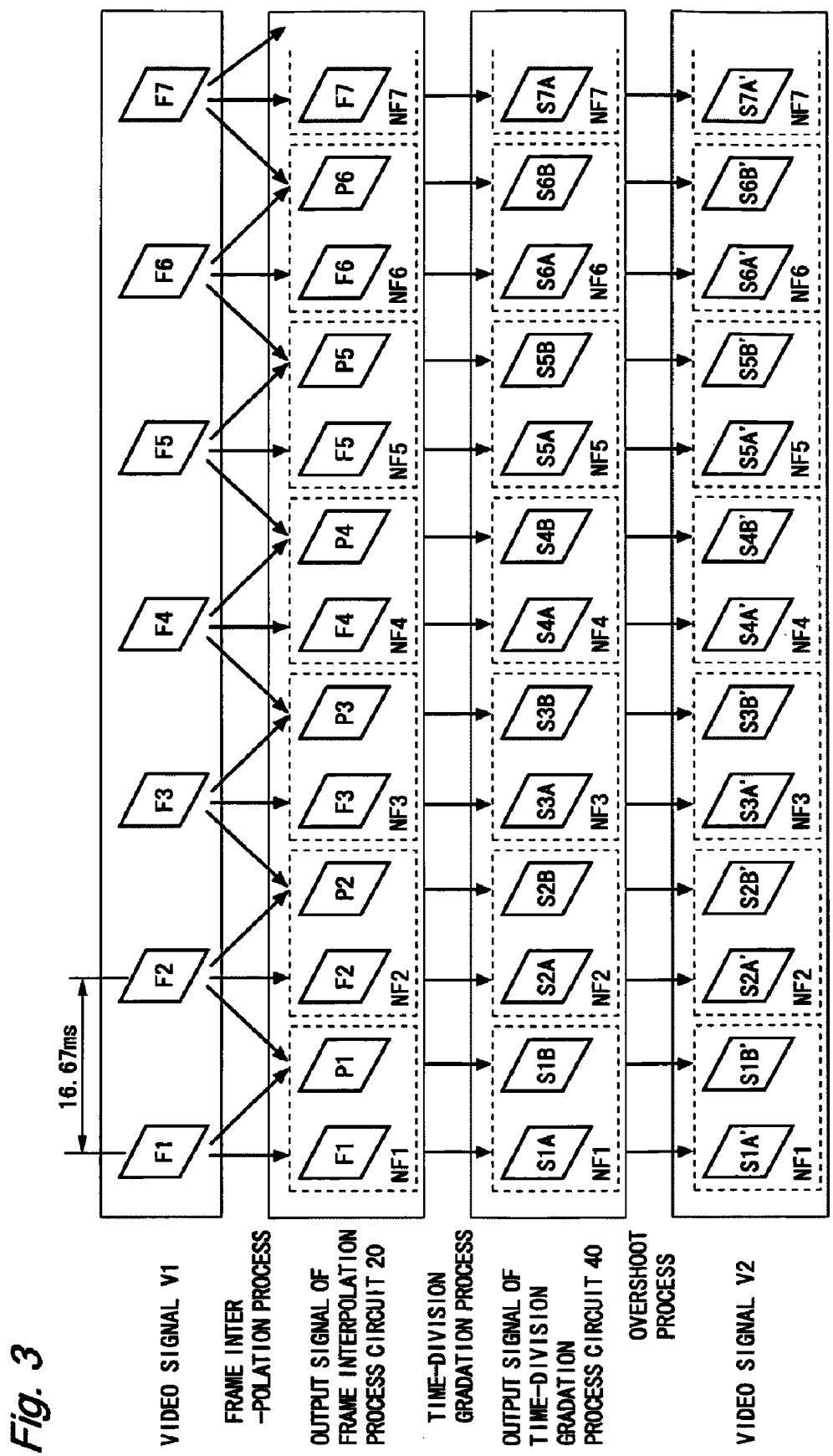
FIG. 3 is a diagram illustrating a frame-by-frame process flow in the liquid crystal display device shown in FIG. 1.

FIG. 3 is a diagram illustrating a frame-by-frame process flow in the liquid crystal display device 1. When the video signal V1 has a refresh rate of 60 Hz, the frame interpolation process circuit 20 receives frames F1, F2, . . . , each being inputted every 16.67 ms. In the frame interpolation process circuit 20, an interpolation frame P1 is created based on the frames F1 and F2, and interposed between the frames F1 and F2. A similar process is performed for the interpolation frames P2, P3, and so on. As a result, a video signal having twice (120 Hz) the refresh rate of the video signal V1 is obtained.

Next, a new frame NF1 consisting of two sub-frames, i.e., the frame F1 and the interpolation frame P1, is created. The two sub-frames included in the frame NF1 are converted into first and second sub-frames S1A and S1B in the time-division gradation process circuit 40. The overshoot process circuit 50 performs gradation level conversion only on pixels having their gradation levels changed, so that the first sub-frame S1A is converted into a first sub-frame S1A', and the second sub-frame S1B is converted into a second sub-frame S1B'. Similarly, the frames F2, F3, . . . , included in the video signal V1 are converted into sub-frames S2A', S2B', S3A', S3B', . . . , respectively.

Figure 4:
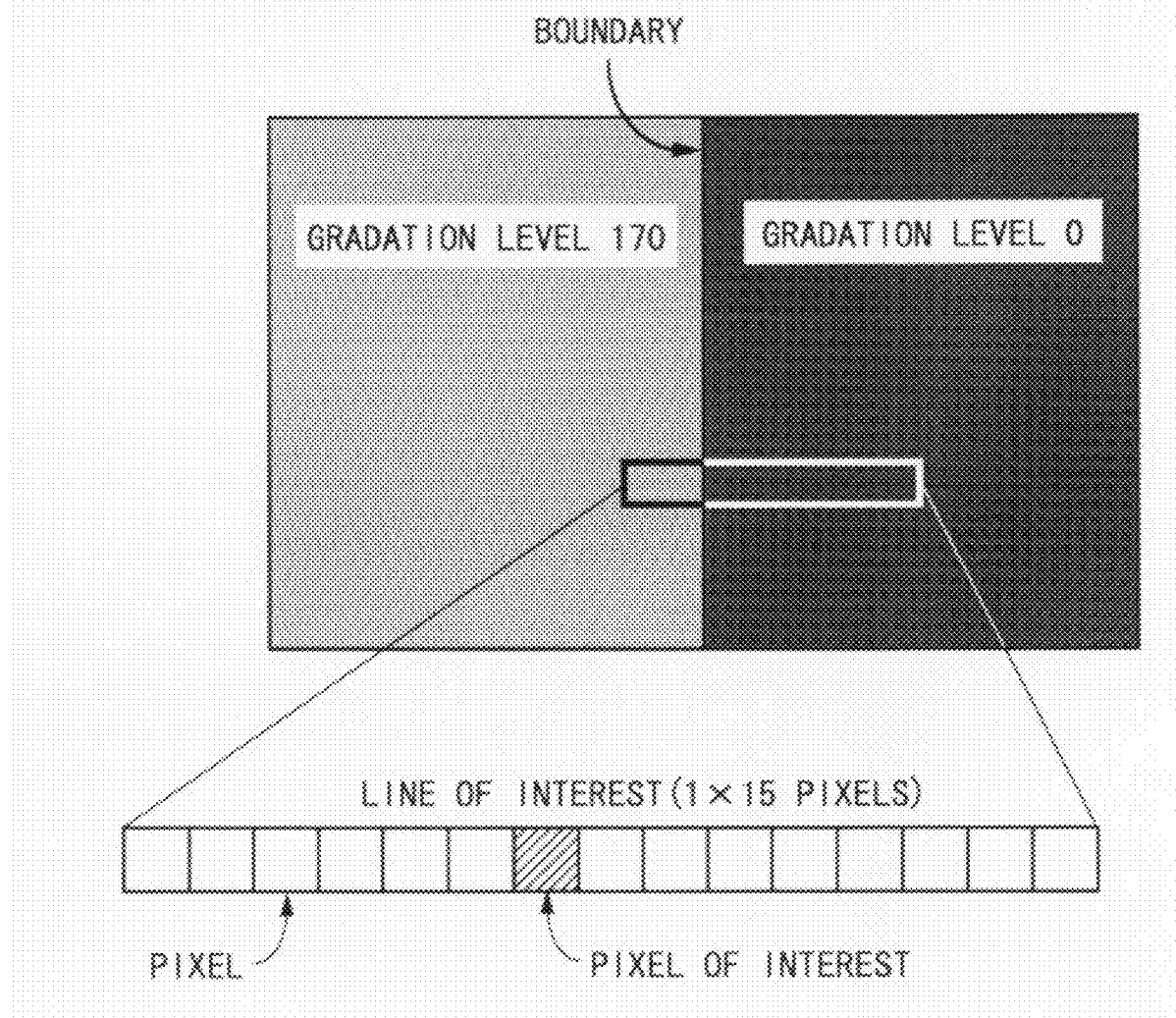
FIG. 4 is a diagram illustrating an exemplary display screen of the liquid crystal display device shown in FIG. 1.

The change in gradation level for each pixel in the liquid crystal display device 1 will be described below. Here, an example as shown in FIG. 4 is considered where a region at a gradation level of 170 and a region at a gradation level of 0 are displayed on the screen, and the boundary between the two regions moves horizontally rightward at a rate of two pixels per frame. In addition, a region of 1 pixel high×15 pixels wide within the screen is referred to as a "line of interest", and a pixel in the line of interest (the seventh pixel from the left) is referred to as a "pixel of interest".

Figure 9:
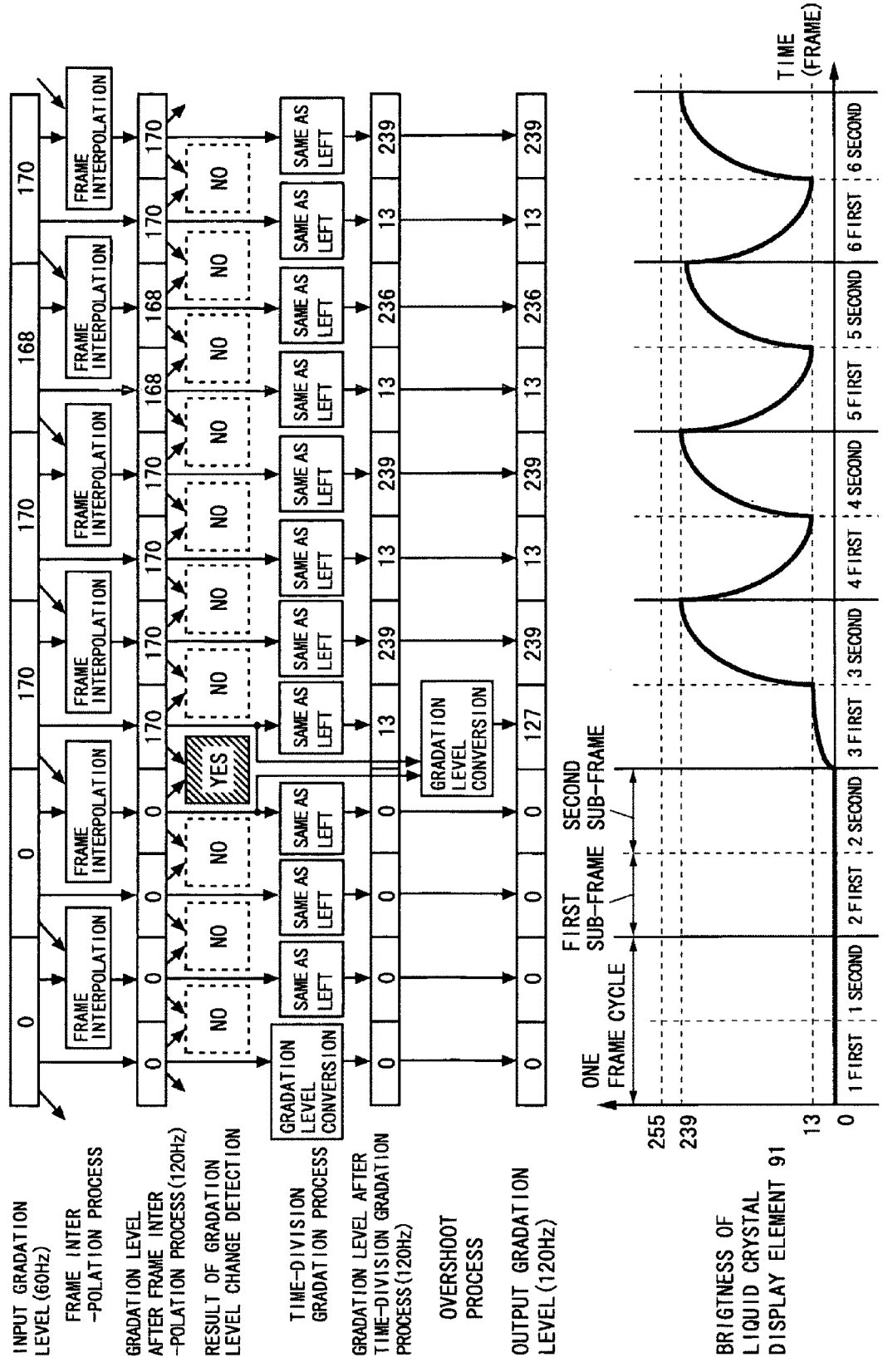
FIG. 9 is a diagram illustrating exemplary changes in gradation level of a video signal and in brightness of a liquid crystal display element, in relation to a pixel in the liquid crystal display device shown in FIG. 1.

FIGS. 5 to 8 are diagrams respectively illustrating exemplary changes over six frame cycles of the video signal V1, an output signal of the frame interpolation process circuit 20, an output signal of the time-division gradation process circuit 40, and the video signal V2, in relation to pixels in the line of interest. In FIGS. 5 to 8, the horizontal axis denotes the horizontal display positions of the pixels, whereas the vertical axis denotes time in units of frame cycles or sub-frame cycles. FIG. 9 is a diagram illustrating changes over six frame cycles in gradation level of the video signal and in brightness of the liquid crystal display element 91, in relation to the pixel of interest. Note that the brightness shown in FIG. 9 is the value converted to the gradation level in hold-type display (the same applies to the following figures).

Figure 5:
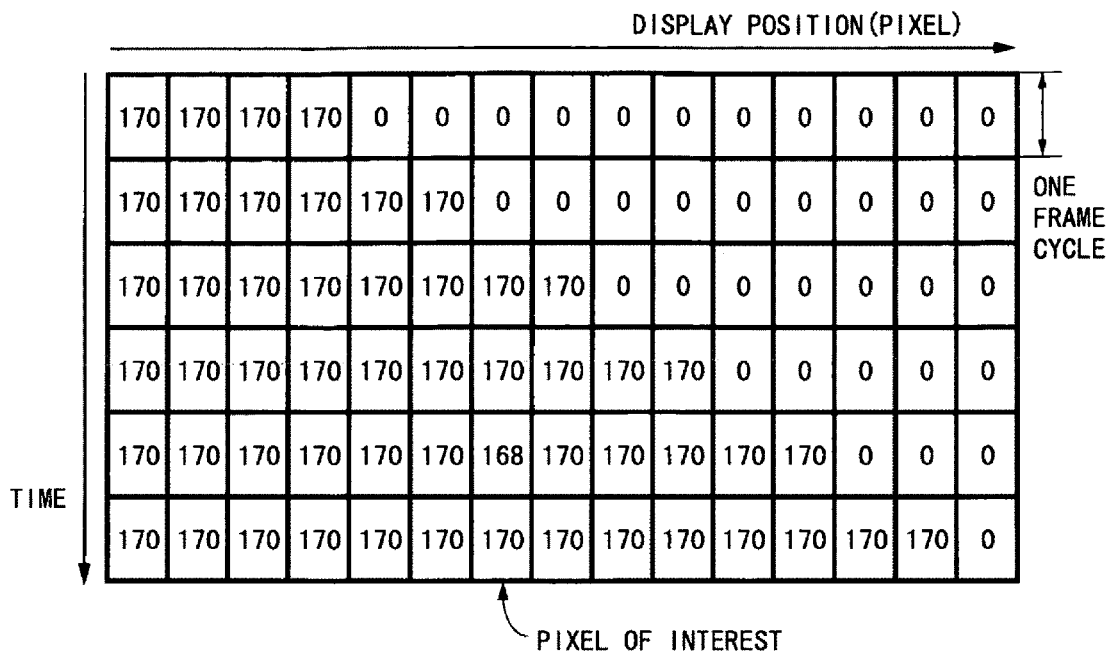
FIG. 5 is a diagram illustrating an exemplary change of a video signal inputted to the liquid crystal display device shown in FIG. 1.
Figure 6:
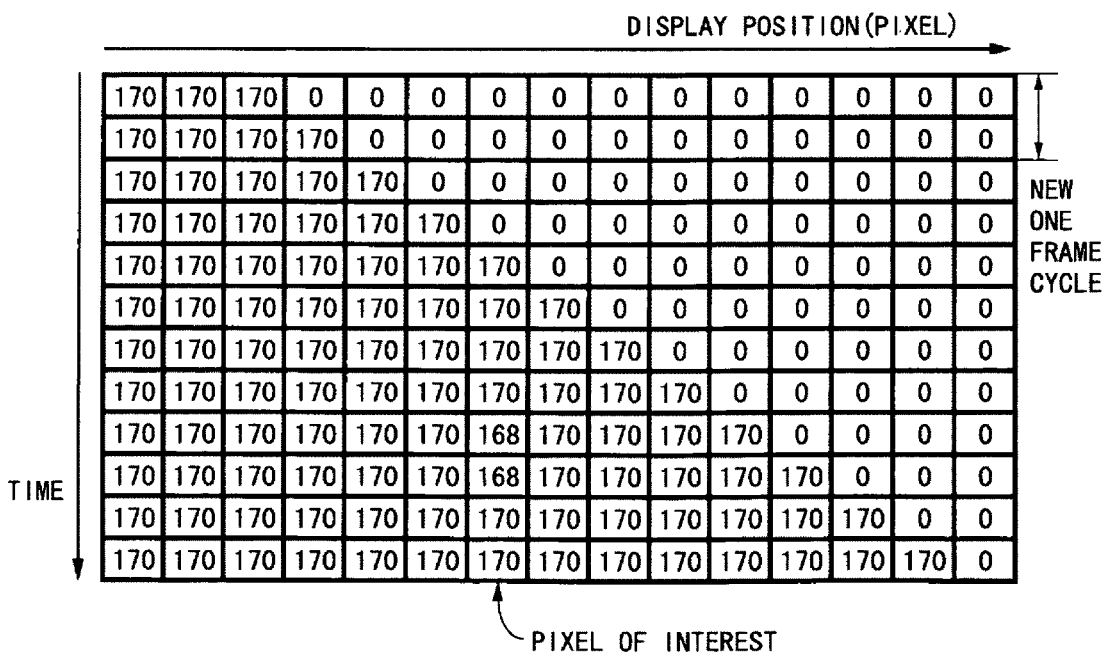
FIG. 6 is a diagram illustrating an exemplary change of an output signal of a frame interpolation process circuit in the liquid crystal display device shown in FIG. 1.

In the frame interpolation process by the frame interpolation process circuit 20, a motion-compensated frame is created and interposed between previous and current frames. When the input gradation level of the pixel of interest changes at a rate of 60 Hz in the order: 0, 0, 170, 170, 168, 170, as shown in FIG. 5, the gradation level after the frame interpolation process changes at a rate of 120 Hz in the order: 0, 0, 0, 0, 170, 170, 170, 170, 168, 168, 170, 170, as shown in FIG. 6.

FIG. 9 also shows gradation level change detection results by the gradation level change detection circuit 70. Here, to prevent any false operation due to, for example, noise contamination, the gradation level change detection circuit 70 makes a determination regarding a change in gradation level based on a threshold of 4, such that a determination "changed" is made for any gradation change by ±4 levels or more, and a determination "not changed" is made for any gradation change by less than ±4 levels. For example, in the example shown in FIG. 9, the second sub-frame of the second frame has a gradation level of 0, and the first sub-frame of the third frame has a gradation level of 170. In this case, the amount of change in gradation level is 170, and therefore the determination "changed" is made. On the other hand, the second sub-frame of the fourth frame has a gradation level of 170, and the first sub-frame of the fifth frame has a gradation level of 168. In this case, the amount of change in gradation level is –2, and therefore the determination "not changed" is made.

The time-division gradation process circuit 40 performs the gradation level conversion differently for the first and second sub-frames. Accordingly, in general, the post-conversion gradation level varies between the first and second sub-frames. For example, in the example shown in FIG. 9, when the input gradation level is 0, the post-conversion gradation level is 0 during both the first and second sub-frames, but when the input gradation level is 170, the post-conversion gradation level is 13 during the first sub-frame, and 239 during the second sub-frame.

Note that when performing time-division gradation drive, it is desirable to distribute brightness to the second sub-frame as much as possible, and therefore the first sub-frame might have brightness distributed thereto only when the maximum brightness is distributed to the second sub-frame. However, in the time-division gradation process circuit 40, even when the maximum brightness is not distributed to the second sub-frame, the first sub-frame has brightness distributed thereto. For example, in the example shown in FIG. 9, when the input gradation level is 170, the post-conversion gradation level is 13 (not the minimum 0) during the first sub-frame, and 239 (not the maximum 255) during the second sub-frame. The reason why the time-division gradation process circuit 40 performs such gradation level conversion will be described later.

The overshoot process circuit 50 determines whether or not to perform gradation level conversion for emphasizing a temporal change of the signal in accordance with the change detection signal C. In the example shown in FIG. 9, the determination "changed" is made upon a transition between the second sub-frame of the second frame to the first sub-frame of the third frame, and the gradation level to be outputted during the first sub-frame of the third frame is 127 as read from the LUT 52. Otherwise, the determination "not changed" is made, and the gradation level outputted from the time-division gradation process circuit 40 is outputted without modification. By performing such gradation level conversion, it becomes possible to make up for a lack of response speed of the liquid crystal display elements 91.

Figure 10:
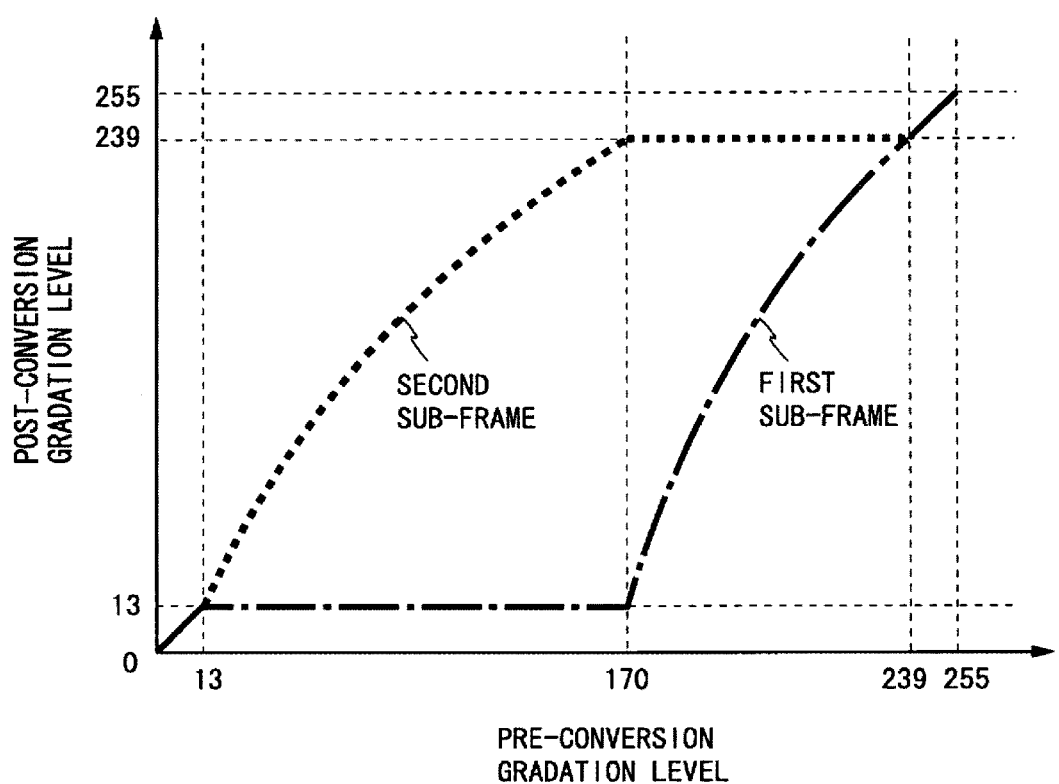
FIG. 10 is a graph illustrating characteristics of gradation level conversion by the time-division gradation process circuit in the liquid crystal display device shown in FIG. 1.

Hereinafter, the time-division gradation process circuit 40 will be described in detail with specific examples. FIG. 10 is a graph illustrating characteristics of the gradation level conversion by the time-division gradation process circuit 40. In FIG. 10, the horizontal axis denotes the pre-conversion gradation level, and the vertical axis denotes the post-conversion gradation level. In FIG. 10, the post-conversion gradation level is indicated by the dashed line for the first sub-frame and by the broken line for the second sub-frame.

As shown in FIG. 10, when the pre-conversion gradation level is either 13 or less, or 239 or more, the post-conversion gradation level is the same as the pre-conversion gradation level during both the first and second sub-frames. In addition, when the pre-conversion gradation level is from 14 to less than 170, the post-conversion gradation level is 13 during the first sub-frame, and a value corresponding to the pre-conversion gradation level during the second sub-frame. In addition, when the pre-conversion gradation level is from 170 to less than 239, the post-conversion gradation level is 239 during the second sub-frame, and a value corresponding to the pre-conversion gradation level during the first sub-frame.

Figure 11:
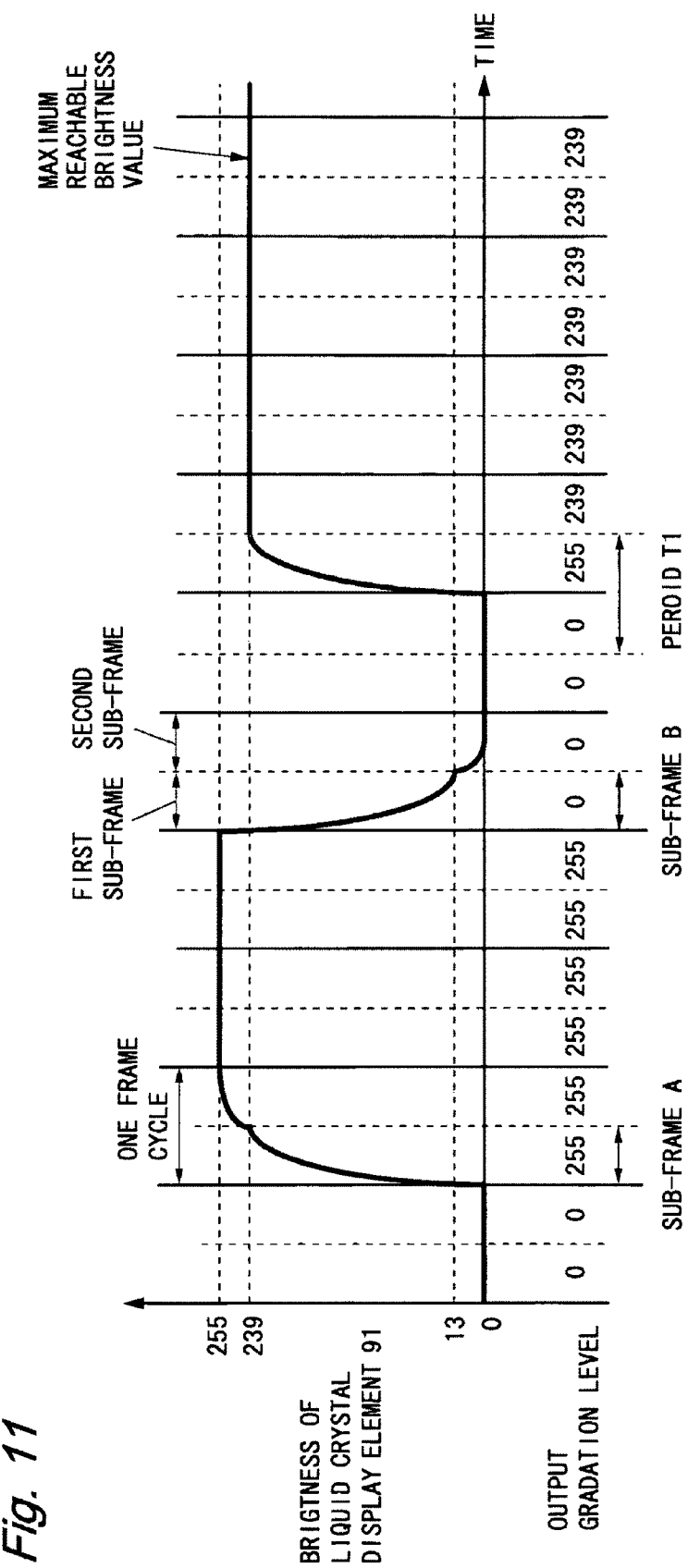
FIG. 11 is a diagram illustrating exemplary changes in gradation level of a video signal provided to a liquid crystal display element and in brightness of the liquid crystal display element in the liquid crystal display device shown in FIG. 1.
Figure 12:
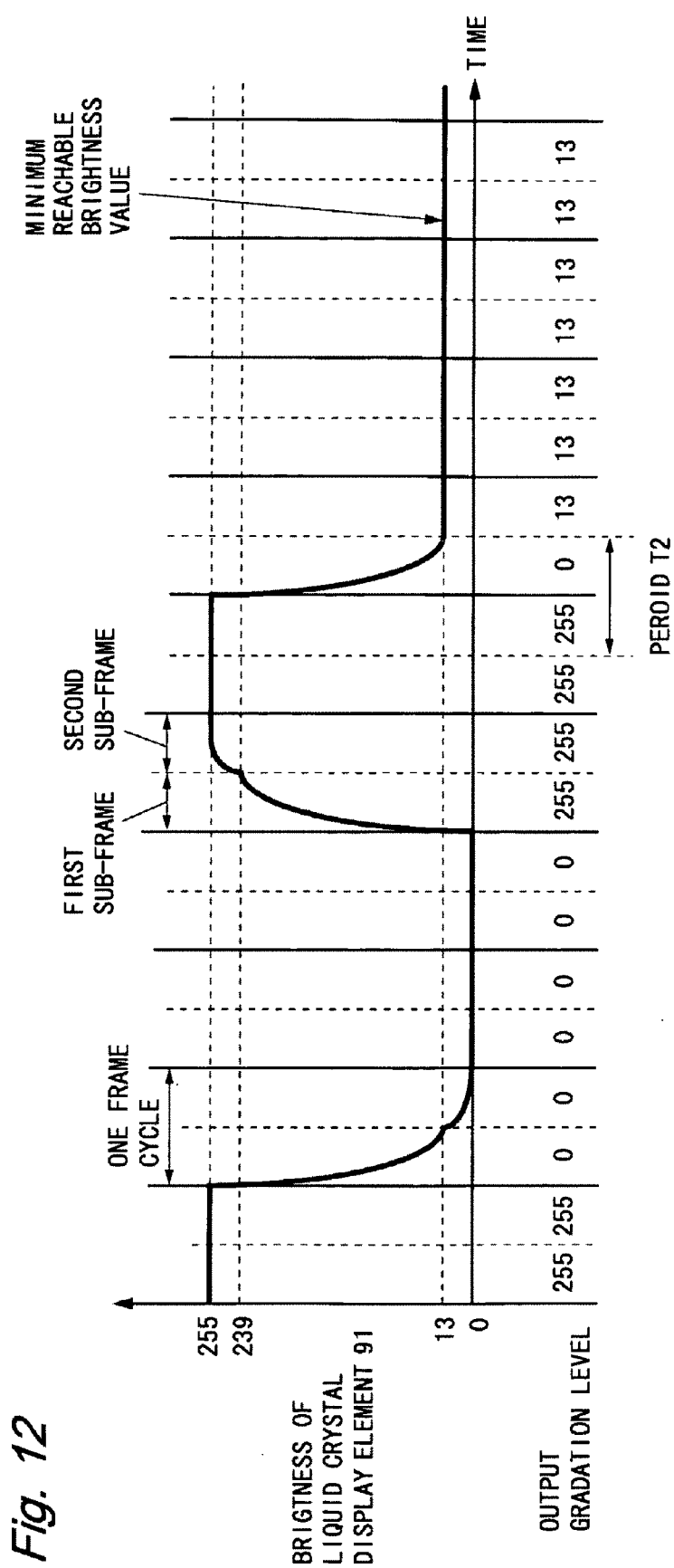
FIG. 12 is a diagram illustrating other exemplary changes in gradation level of a video signal provided to a liquid crystal display element and in brightness of the liquid crystal display element in the liquid crystal display device shown in FIG. 1.

The gradation level after the conversion in the time-division gradation process circuit 40 is determined by, for example, the following method. FIGS. 11 and 12 are graphs illustrating changes in gradation level of the video signal V2 and in brightness of the liquid crystal display elements 91. It should be noted that the video signal V2 has a refresh rate of 120 Hz, and the liquid crystal display elements 91 have a response speed slower than a speed corresponding to a sub-frame cycle (8.3 ms).

In FIG. 11, the gradation level of the video signal V2 changes from the minimum 0 to the maximum 255 during the sub-frame A, but the brightness of the liquid crystal display elements 91 does not reach the maximum 255 at the end of the sub-frame A, only rising to a smaller value of 239. In addition, the gradation level of the video signal V2 changes from the maximum 255 to the minimum 0 during the sub-frame B, but the brightness of the liquid crystal display elements 91 does not reach the minimum 0 at the end of the sub-frame B, only falling to a greater value of 13.

Such brightness of the display elements after one sub-frame cycle since the gradation level of the video signal provided to the display elements changed from minimum to maximum is referred to as "maximum reachable brightness", whereas the brightness of the display elements after one sub-frame cycle since the gradation level of the video signal provided to the display elements changed from maximum to minimum is referred to as "minimum reachable brightness". In the example shown in FIG. 11, the maximum reachable brightness is 239, and the minimum reachable brightness is 13.

Figure 32:
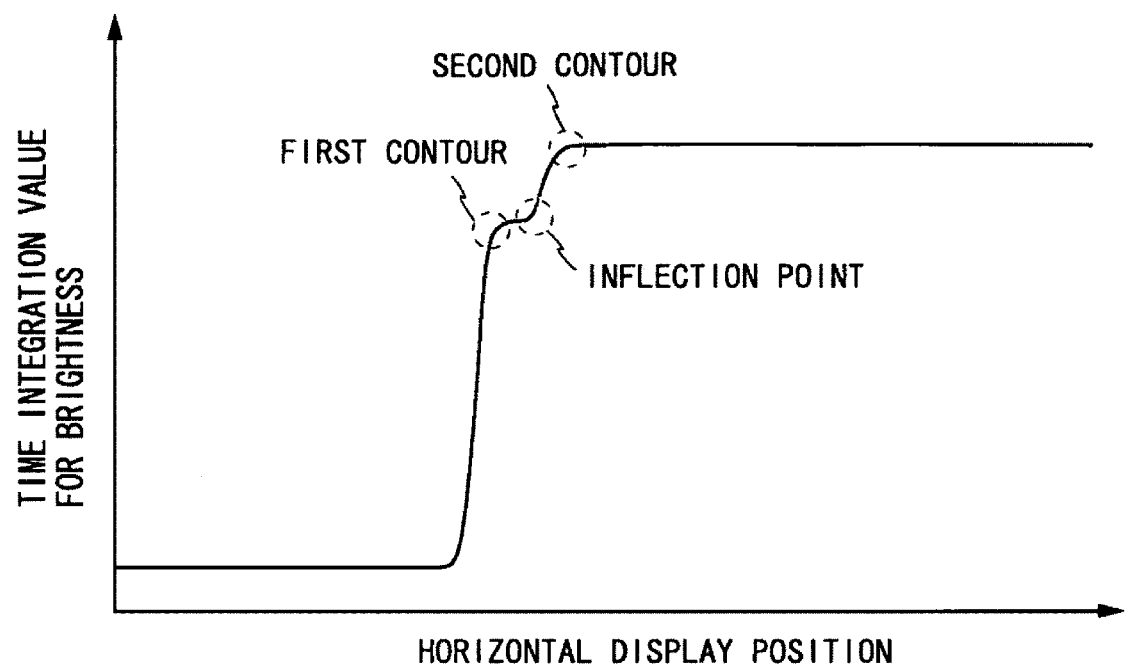
FIG. 32 is a diagram illustrating a change in brightness around a boundary, as seen by the viewer, in the conventional image display device.

In the case of an image display device using display elements with a response speed slower than a speed corresponding to one sub-frame cycle, boundaries between gradation levels being changed appear differently between the cases where hold drive and impulse drive are performed. In the case of an image display device performing hold drive, boundaries between gradation levels appear blurry, whereas in the case of an image display device performing impulse drive, two contours, i.e., true and false contours, appear at the boundaries between gradation levels (see FIG. 32). Neither case is preferable in terms of appearance of the boundaries, but the viewer would perceive the latter to be inferior in display quality to the former.

Therefore, in the liquid crystal display device 1, to improve moving image display performance via impulse drive while preventing two contours from appearing via impulse drive, the time-division gradation process circuit 40 distributes brightness to both the first and second sub-frames such that impulse drive is performed when the response can be improved via an overshoot process, and hold drive is performed when the response cannot be improved via an overshoot process.

Specific examples will be described below. The brightness of the liquid crystal display elements 91 corresponds to the maximum reachable brightness, i.e., 239, when the output gradation level rises from 0 to 255, as in period T1 in FIG. 11, and the minimum reachable brightness, i.e., 13, when the output gradation level falls from 255 to 0, as in period T2 in FIG. 12. From this, it can be appreciated that the upper and lower limits of the output gradation level allowing improvement of the response via an overshoot process are 239 and 13, respectively. Accordingly, the difference in brightness between the first and second sub-frames is assumed to be maximized when the output gradation level is 13 during the first sub-frame and 239 during the second sub-frame, as in the fourth and subsequent frames in FIG. 9.

For output gradation levels from 14 to 238, the response can be improved via an overshoot process, and therefore the time-division gradation process circuit 40 performs impulse drive while distributing different levels of brightness to the first and second sub-frames. On the other hand, for output gradation levels of 13 or less, or 239 or more, the response cannot be improved via an overshoot process, and therefore the time-division gradation process circuit 40 performs hold drive while distributing the same level of brightness to the first and second sub-frames. As a result, it is possible to improve moving image display performance via impulse drive while preventing two contours from appearing via impulse drive.

While the foregoing has been described with respect to the case where the time-division gradation process circuit 40 distributes brightness placing priority on preventing two contours from appearing via an overshoot process, the brightness may be distributed placing priority on improving moving image display performance via impulse drive. In the case where priority is placed on improving moving image display performance, the time-division gradation process circuit 40 may perform impulse drive by distributing different levels of brightness to the first and second sub-frames for output gradation levels from, for example, 1 to 254. Also, the time-division gradation process circuit 40 may appropriately change the range of output gradation levels for which different levels of brightness are distributed to the first and second sub-frames.

The gradation level after the conversion in the overshoot process circuit 50 is determined by, for example, the following method. The overshoot process circuit 50 changes the post-conversion gradation level between the first and second sub-frames. The overshoot process circuit 50 performs overshoot process on a pixel of interest during the first sub-frame of the third frame (see FIG. 9), and performs overshoot process on a pixel to the right of the pixel of interest during the second sub-frame of the third frame (see FIG. 13).

The method for determining the post-conversion gradation level for the first sub-frame will be described with reference to FIG. 9. In FIG. 9, the determination "changed" is made for the first sub-frame of the third frame, and the gradation level after the time-division gradation process is 13. In this case, to prevent two contours from appearing, the first sub-frame of the third frame may be equalized in brightness with the first sub-frame of the fourth frame subsequent thereto, and to this end, the post-conversion gradation level may be determined such that the brightness corresponds to the minimum reachable brightness being 13 during the first sub-frame of the third frame. As a result, when the gradation level during the previous sub-frame is 0, the gradation level during the current sub-frame is 170, and the current sub-frame is the first sub-frame, the post-conversion gradation level is determined to be 127.

Figure 13:
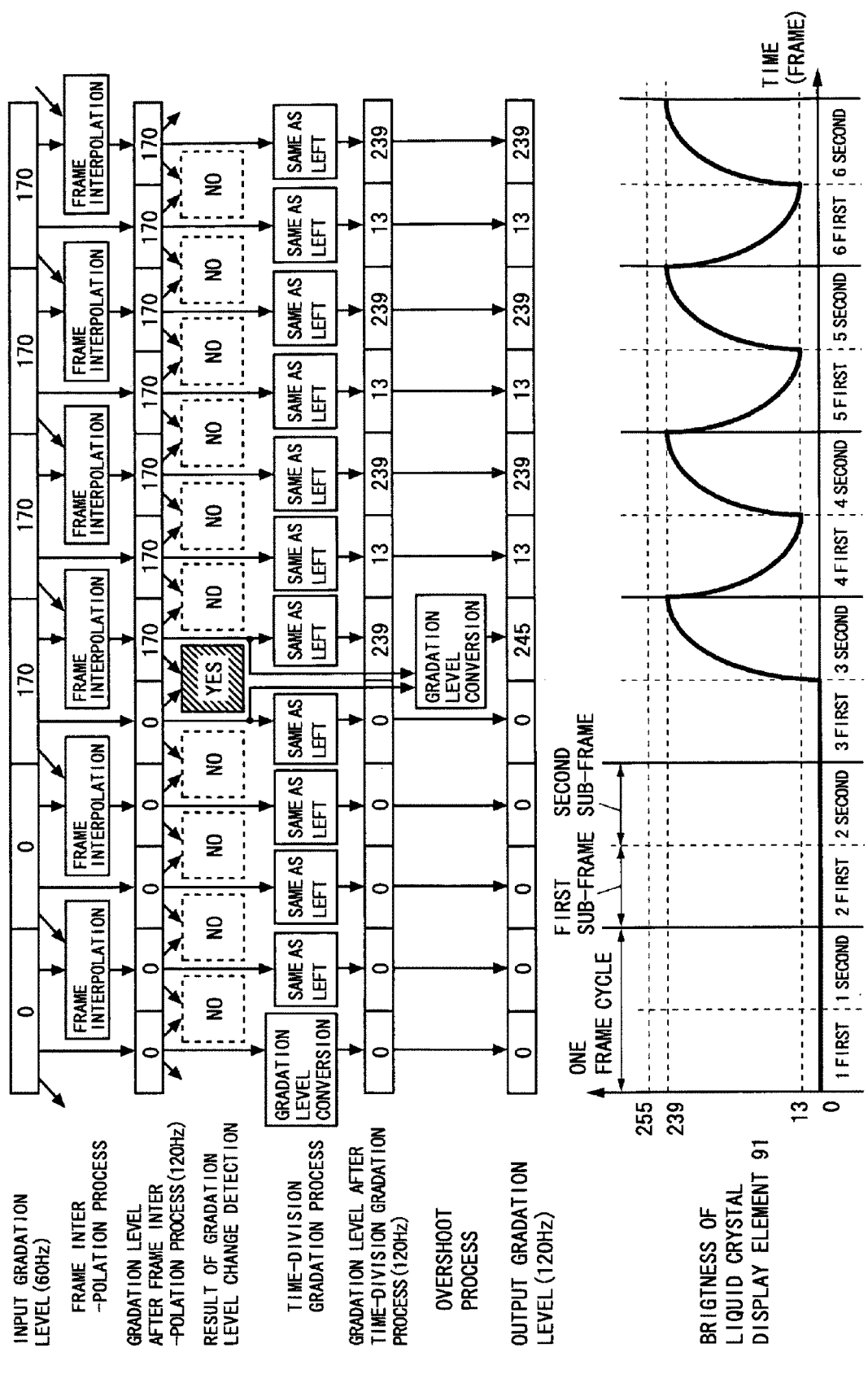
FIG. 13 is a diagram illustrating exemplary changes in gradation level of a video signal and in brightness of a liquid crystal display element, in relation to another pixel in the liquid crystal display device shown in FIG. 1.

Similarly, the method for determining the post-conversion gradation level for the second sub-frame will be described with reference to FIG. 13. In FIG. 13, the determination "changed" is made for the second sub-frame of the third frame, and the gradation level after the time-division gradation process is 239. In this case, to prevent two contours from appearing, the second sub-frame of the third frame may be equalized in brightness with the second sub-frame of the fourth frame subsequent thereto, and to this end, the post-conversion gradation level may be determined such that the brightness corresponds to the maximum reachable brightness being 239 during the second sub-frame of the third frame. As a result, when the gradation level of the previous sub-frame is 0 and the gradation level of the current sub-frame is 170, and the current sub-frame is the second sub-frame, the post-conversion gradation level is determined to be 245.

To obtain different gradation levels for the first and second sub-frames, the LUT 52 of the overshoot process circuit 50 includes first and second sub-frame LUTs. The processing portion 51 selects the first sub-frame LUT when processing the first sub-frame, and the second sub-frame LUT when processing the second sub-frame, and reads, from the selected LUT, gradation levels corresponding to the gradation levels of the current and previous sub-frames.

Figure 14:
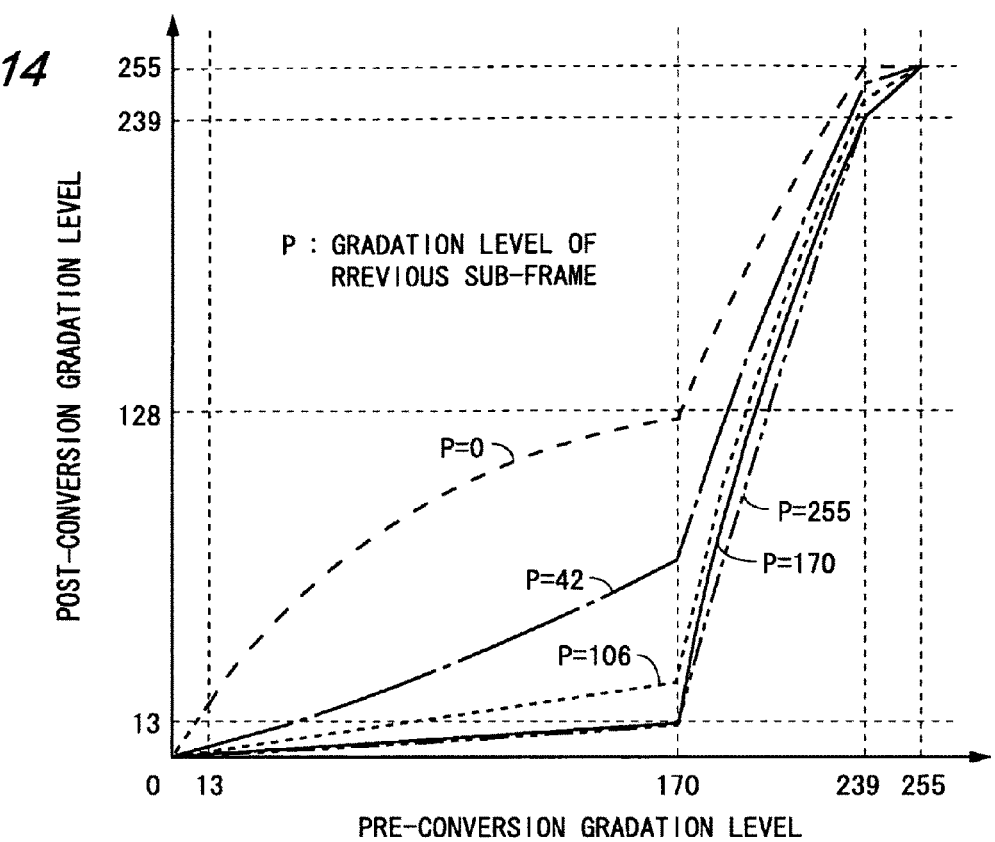
FIG. 14 is a graph illustrating characteristics of first sub-frame gradation level conversion by the overshoot process circuit in the liquid crystal display device shown in FIG. 1.
Figure 15:
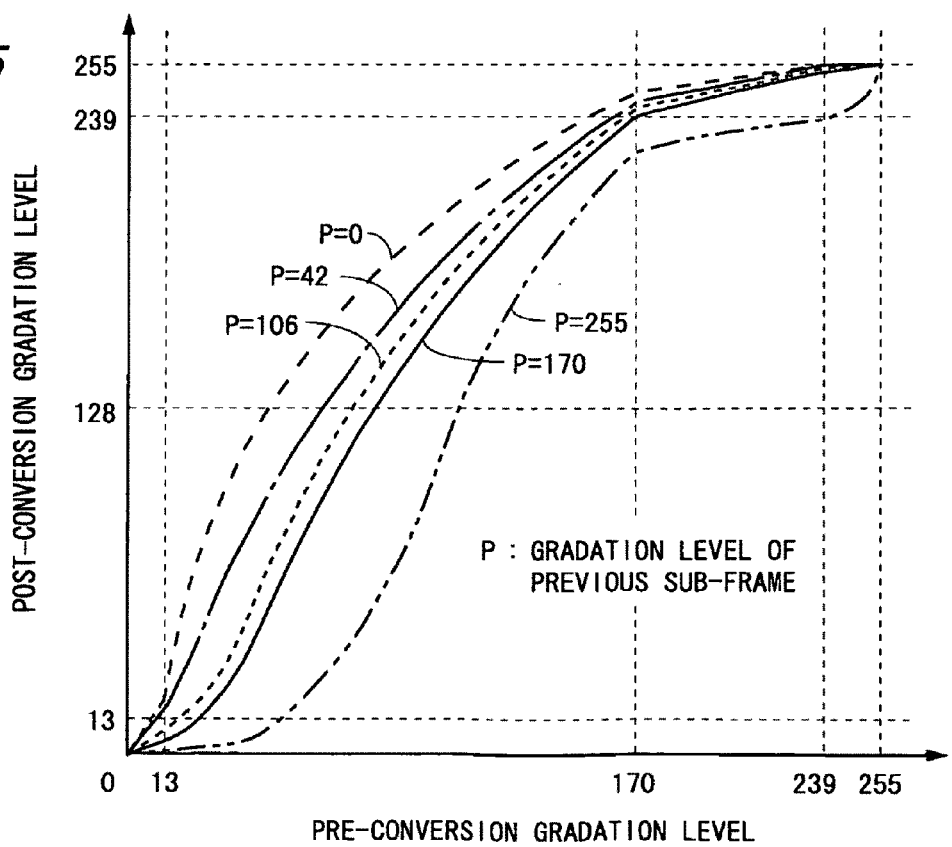
FIG. 15 is a graph illustrating characteristics of second sub-frame gradation level conversion by the overshoot process circuit in the liquid crystal display device shown in FIG. 1.

FIGS. 14 and 15 are graphs showing characteristics of the gradation level conversion by the overshoot process circuit 50. FIG. 14 shows characteristics for the first sub-frame, and FIG. 15 shows characteristics for the second sub-frame. In FIGS. 14 and 15, a plurality of graphs are plotted for the gradation level P of the previous sub-frame with the horizontal axis denoting the pre-conversion gradation level and the vertical axis denoting the post-conversion gradation level. As is apparent from these two figures, the characteristics of the gradation level conversion by the overshoot process circuit 50 vary between the first and second sub-frames. In this manner, the overshoot process circuit 50 performs the gradation level conversion differently for each sub-frame within one frame.

The overshoot process circuit 50 may be configured arbitrarily so long as gradation level conversion exhibiting characteristics as shown in FIGS. 14 and 15 is performed. For example, the LUT 52 may have post-conversion gradation levels stored therein in association with all combinations of gradation levels for the current and previous sub-frames, and the processing portion 51 may read the post-conversion gradation levels stored in the LUT 52 (first configuration). Alternatively, to reduce the circuit scale of the LUT 52, the LUT 52 may have post-conversion gradation levels stored therein in association with combinations of representative gradation levels for the current and previous sub-frames, and any post-conversion gradation levels associated with combinations of gradation levels not stored in the LUT 52 may be obtained by the processing portion 51 via linear interpolation computation or suchlike (second configuration). Alternatively, the overshoot process circuit 50 may not necessarily include the LUT 52, and the processing portion 51 may obtain a post-conversion gradation level via arithmetic processing based on gradation levels for the current and previous sub-frames (third configuration).

According to the first configuration, optimum amounts of overshoot can be freely set for all input gradation levels. According to the second configuration, it is not necessary to provide a large amount of storage circuitry, such as a ROM, and therefore it is possible to reduce cost of the image display device. According to the third configuration, by simply providing a small amount of storage circuitry, it becomes possible to set appropriate amounts of overshoot.

A specific example of the second configuration will be described. When the gradation level of a video signal outputted from the frame interpolation process circuit 20 varies in the range from 0 to 255, representative gradation levels for the current sub-frame are set to be 0, 42, 106, 170, and 255, and representative gradation levels for the previous sub-frame are set to be the same values. In this case, the LUT 52 has 25 (=5×5) post-conversion gradation levels stored therein for each of the first and second sub-frames. Note that the number of representative values may be set to more than or less than five, considering circuit scale and arithmetic accuracy.

When selecting representative gradation levels, the representative values preferably include any gradation level (hereinafter, referred to as a "boundary level"; in the example shown in FIG. 10, 170) below which the post-conversion gradation level for the first sub-frame is constant and the post-conversion gradation level for the second sub-frame is variable, and above which the post-conversion gradation level for the second sub-frame is constant and the post-conversion gradation level for the first sub-frame is variable. As a result, even when characteristics of the gradation level conversion by the overshoot process circuit 50 discontinuously change at the boundary level, as shown in FIGS. 14 and 15, it is possible to improve moving image display performance by reducing error generated when gradation level conversion is arithmetically performed for a gradation level close to the boundary level, while appropriately making up for a lack of response speed of the liquid crystal display elements 91.

Figure 16:
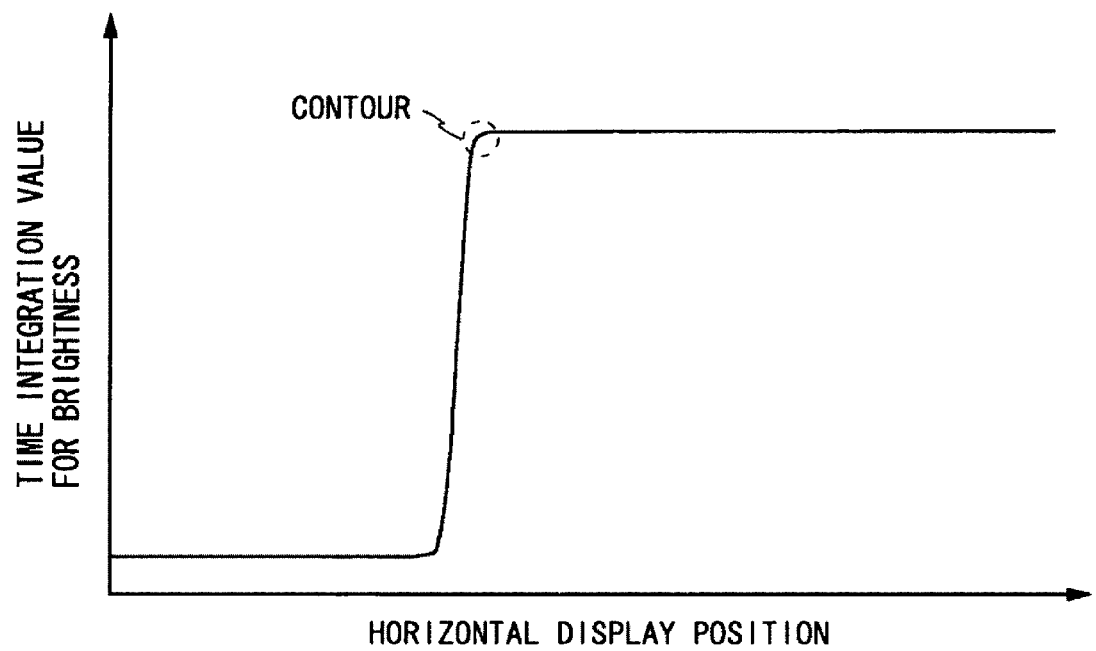
FIG. 16 is a graph illustrating a change in brightness around a boundary, as seen by the viewer, in the liquid crystal display device shown in FIG. 1.

When using the time-division gradation process circuit 40 and the overshoot process circuit 50 thus configured, pixels around the boundary coincide with other pixels in terms of the minimum brightness during the first sub-frame and the maximum brightness during the second sub-frame, as shown in FIGS. 9 and 13. The viewer visually perceives the boundary exhibiting the brightness response waveform as shown in FIGS. 9 and 13, while temporally integrating display brightness along movement of the line of sight. Therefore, the viewer sees brightness around the boundary as shown in FIG. 16. The time integration value for brightness changes in accordance with the horizontal display position, as shown in FIG. 16, but unlike in conventional image display devices (see FIG. 32), there is no point (inflection point) with a small amount of change in time integration value for brightness, and therefore there appears only one point with a large amount of change in time integration value for brightness. The point with a large amount of change in time integration value for brightness is perceived as a contour, and therefore in this case, the viewer visually perceives only one contour. In this manner, the liquid crystal display device 1 makes it possible to suppress occurrence of any false contour different from a true contour.

As described above, in the liquid crystal display device 1 according to the present embodiment, frame interpolation drive and time-division gradation drive are performed, and overshoot drive is performed for pixels having their gradation levels changed between consecutive sub-frames. Frame interpolation drive and time-division gradation drive make it possible to suppress occurrence of any moving image blur, and overshoot drive makes it possible to make up for a lack of response speed of the liquid crystal display elements 91. Accordingly, the liquid crystal display device 1 makes it possible to improve moving image display performance, while making up for the lack of response speed of the display elements.

Second Embodiment

Figure 17:
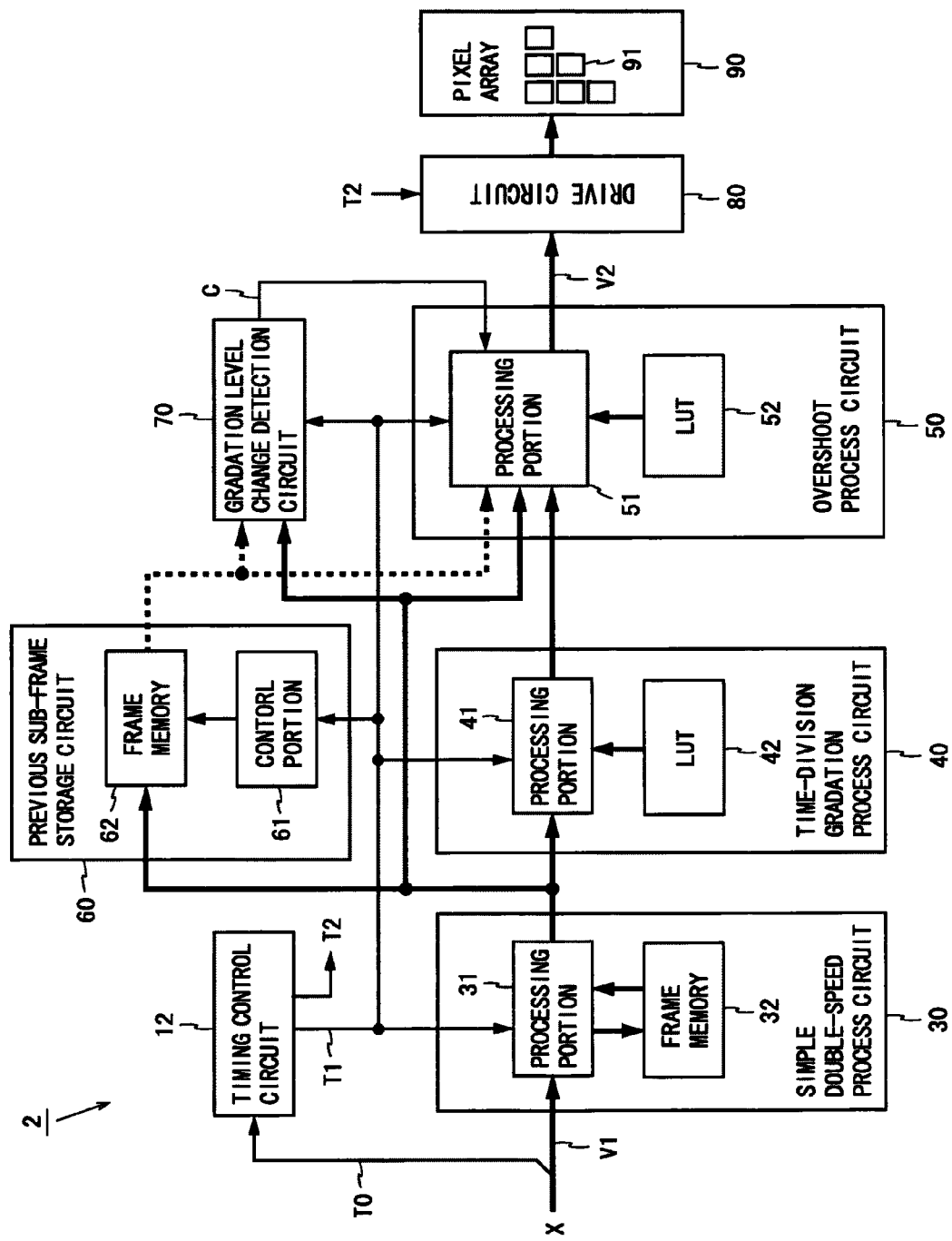
FIG. 17 is a block diagram illustrating the configuration of a liquid crystal display device according to a second embodiment of the present invention.

FIG. 17 is a block diagram illustrating the configuration of a liquid crystal display device 2 according to a second embodiment of the present invention. The liquid crystal display device 2 shown in FIG. 17 includes a timing control circuit 12, a simple double-speed process circuit 30, a time-division gradation process circuit 40, an overshoot process circuit 50, a previous sub-frame storage circuit 60, a gradation level change detection circuit 70, a drive circuit 80, and a pixel array 90. The liquid crystal display device 2 performs three processes (a simple double-speed process, a time-division gradation process, and an overshoot process) on a video signal V1, and provides a gradation display using a resultant video signal V2. In the present embodiment, the simple double-speed process circuit 30 constitutes a video conversion circuit for obtaining a video signal in units of sub-frames based on a video signal inputted in units of frames. In each of the following embodiments, the same elements as in any of the preceding embodiments are denoted by the same reference characters, and any descriptions thereof will be omitted.

An input signal X to be supplied to the liquid crystal display device 2 includes the video signal V1 and a synchronization signal T0. The video signal V1 is inputted to the simple double-speed process circuit 30, and the synchronization signal T0 is inputted to the timing control circuit 12. It should be noted that in the liquid crystal display device 2, the video signal V1 has a refresh rate of 60 Hz. Based on the synchronization signal T0, the timing control circuit 12 outputs a synchronization signal T1 to the simple double-speed process circuit 30, the time-division gradation process circuit 40, the overshoot process circuit 50, the previous sub-frame storage circuit 60, and the gradation level change detection circuit 70, while outputting a synchronization signal T2 to the drive circuit 80.

The simple double-speed process circuit 30 includes a processing portion 31 and a frame memory 32, and outputs the video signal V1 twice at a double speed in units of frames (hereinafter, this process will be referred to as a "simple double-speed process"). More specifically, the frame memory 32 has a capacity capable of memorizing a video signal for at least one frame, and the video signal V1 inputted to the simple double-speed process circuit 30 is written onto the frame memory 32. The processing portion 31 reads the video signal written on the frame memory 32 twice at double the writing speed in units of frames. As a result, a video signal to be outputted from the simple double-speed process circuit 30 has twice (120 Hz) the refresh rate of the video signal V1. As in the first embodiment, the video signal outputted from the simple double-speed process circuit 30 is subjected to the time-division gradation process and the overshoot process.

Figure 18:
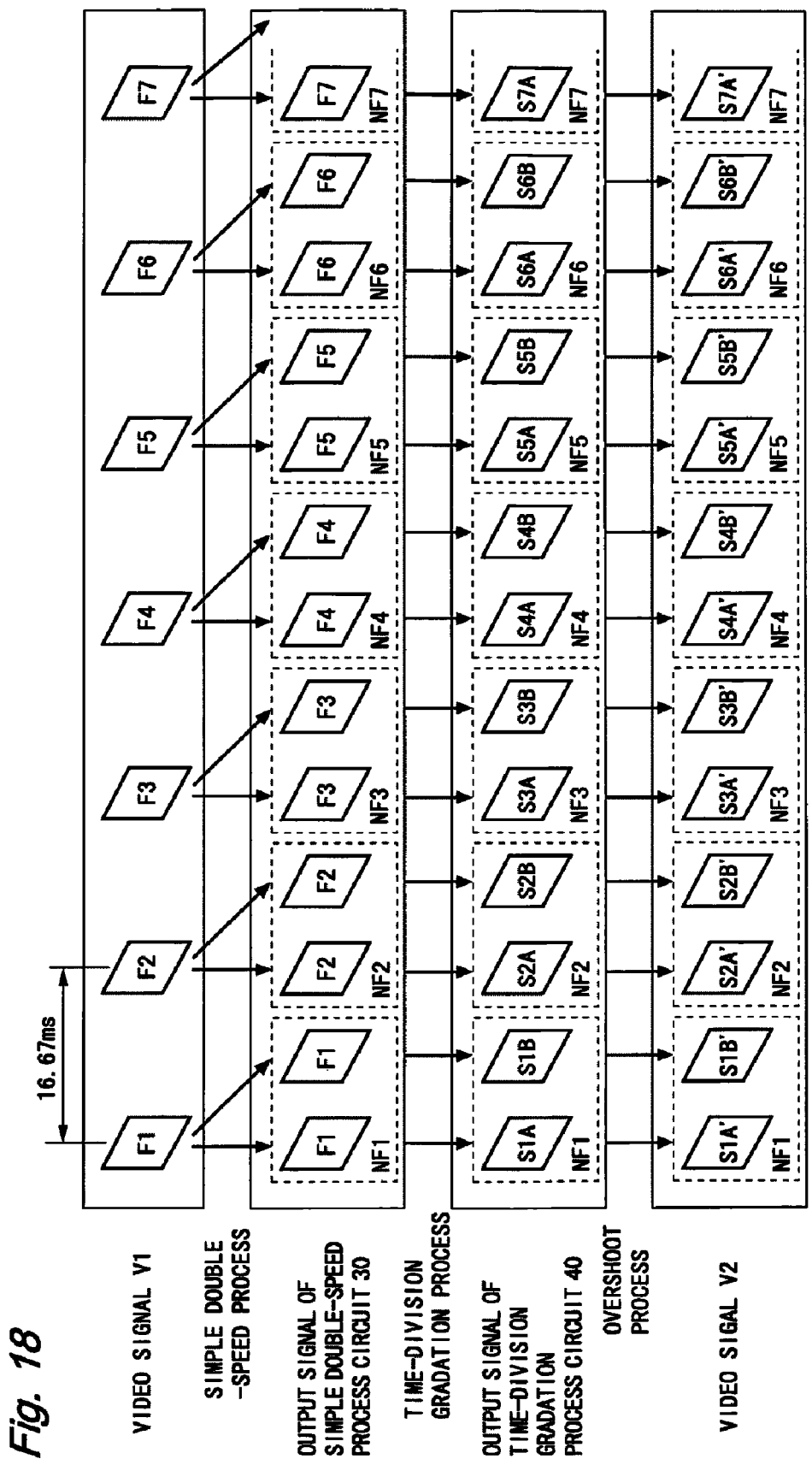
FIG. 18 is a diagram illustrating a frame-by-frame process flow in the liquid crystal display device shown in FIG. 17.

FIG. 18 is a diagram illustrating a frame-by-frame process flow in the liquid crystal display device 2. When the video signal V1 has a refresh rate of 60 Hz, the simple double-speed process circuit 30 receives frames F1, F2, . . . , each being inputted every 16.67 ms. The frame F1 is simply doubled in speed by the simple double-speed process circuit 30 to become a new frame NF1 consisting of two sub-frames having the same content. Subsequent processes (the time-division gradation process and the overshoot process) are the same as in the first embodiment, and therefore any descriptions thereof will be omitted here.

Figure 23:
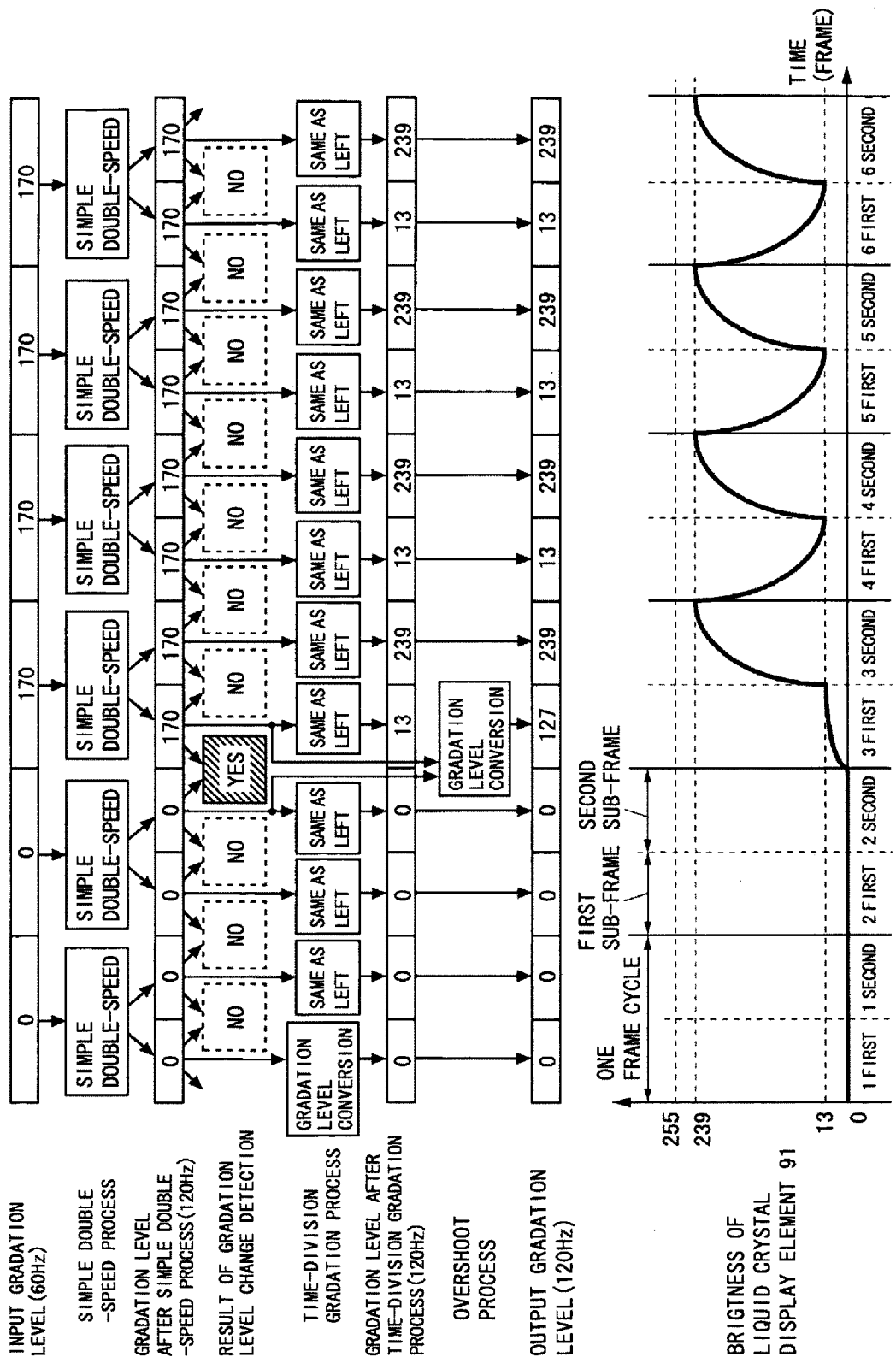
FIG. 23 is a diagram illustrating exemplary changes in gradation level of a video signal and in brightness of a liquid crystal display element, in relation to a pixel in the liquid crystal display device shown in FIG. 17.

As in the first embodiment, the change in gradation level for each pixel in the liquid crystal display device 2 will be described with respect to the example shown in FIG. 4. FIGS. 19 to 22 are diagrams respectively illustrating changes over six frame cycles of the video signal V1, an output signal of the simple double-speed process circuit 30, an output signal of the time-division gradation process circuit 40, and the video signal V2, in relation to pixels in the line of interest. FIG. 23 is a diagram illustrating changes over six frame cycles in gradation level of the video signal and in brightness of the liquid crystal display element 91, in relation to the pixel of interest.

Figure 19:
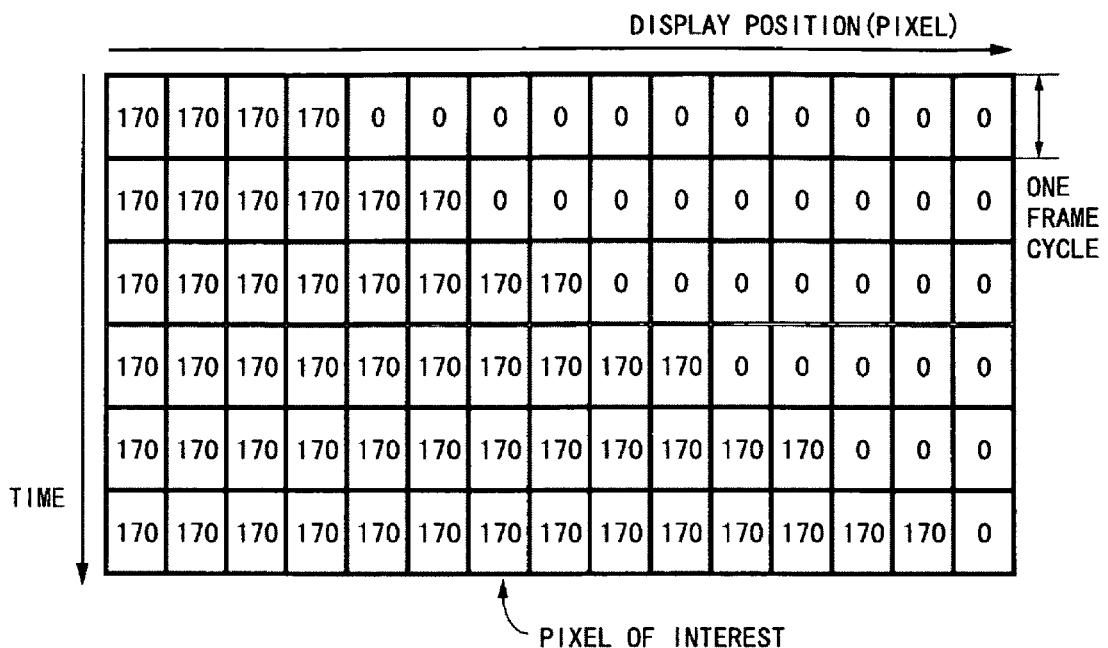
FIG. 19 is a diagram illustrating an exemplary change of a video signal inputted to the liquid crystal display device shown in FIG. 17.
Figure 20:
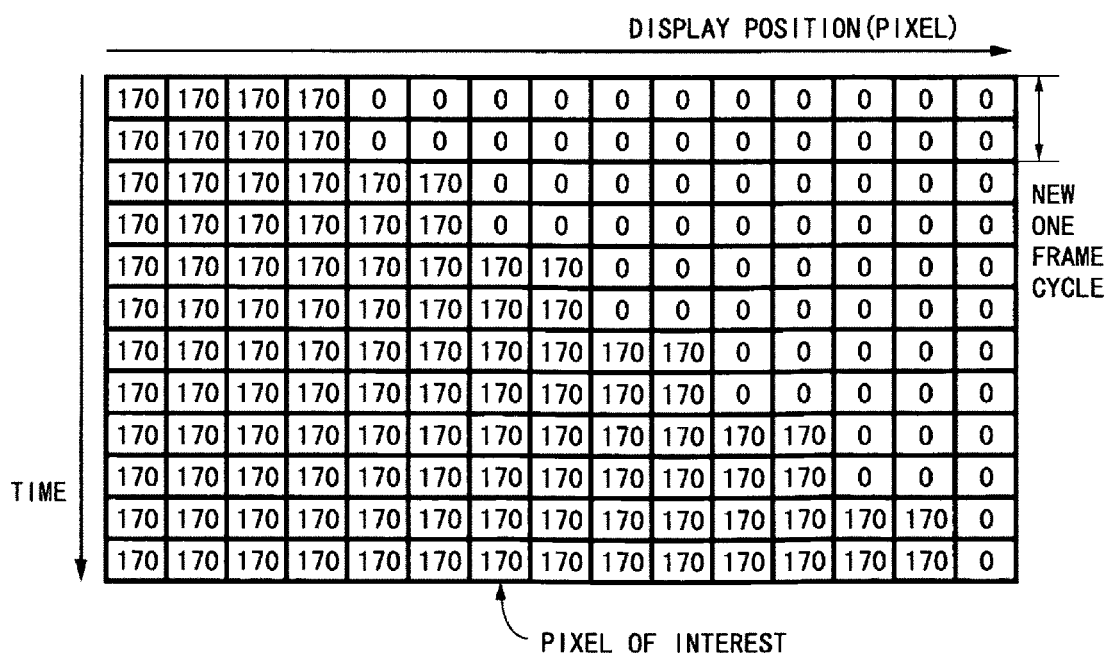
FIG. 20 is a diagram illustrating an exemplary change of an output signal of a simple double-speed process circuit in the liquid crystal display device shown in FIG. 17.
Figure 21:
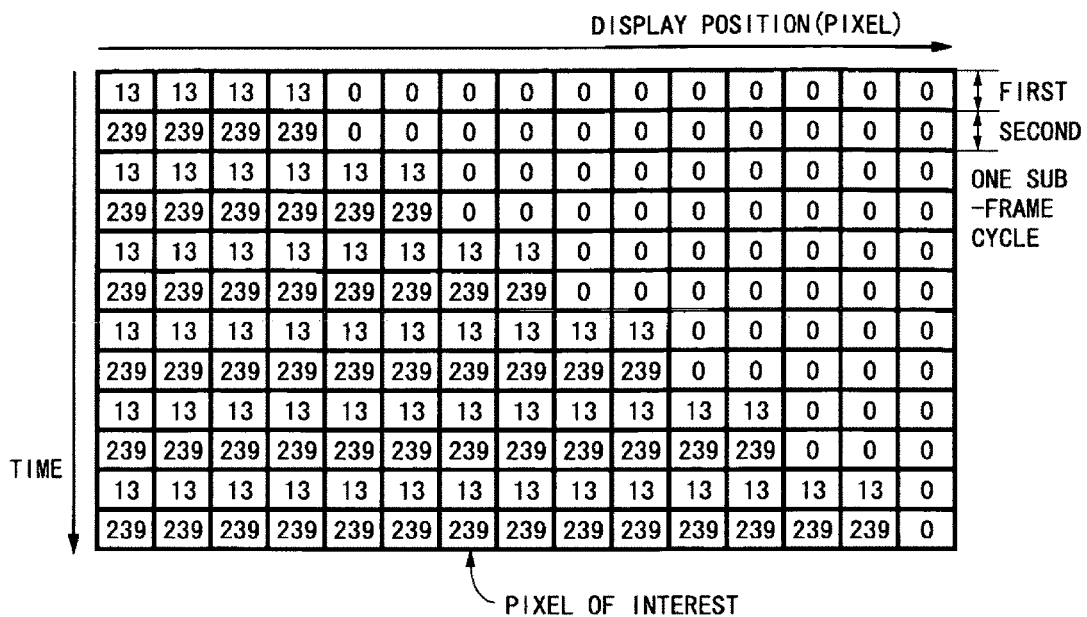
FIG. 21 is a diagram illustrating an exemplary change of an output signal of a time-division gradation process circuit in the liquid crystal display device shown in FIG. 17.
Figure 22:
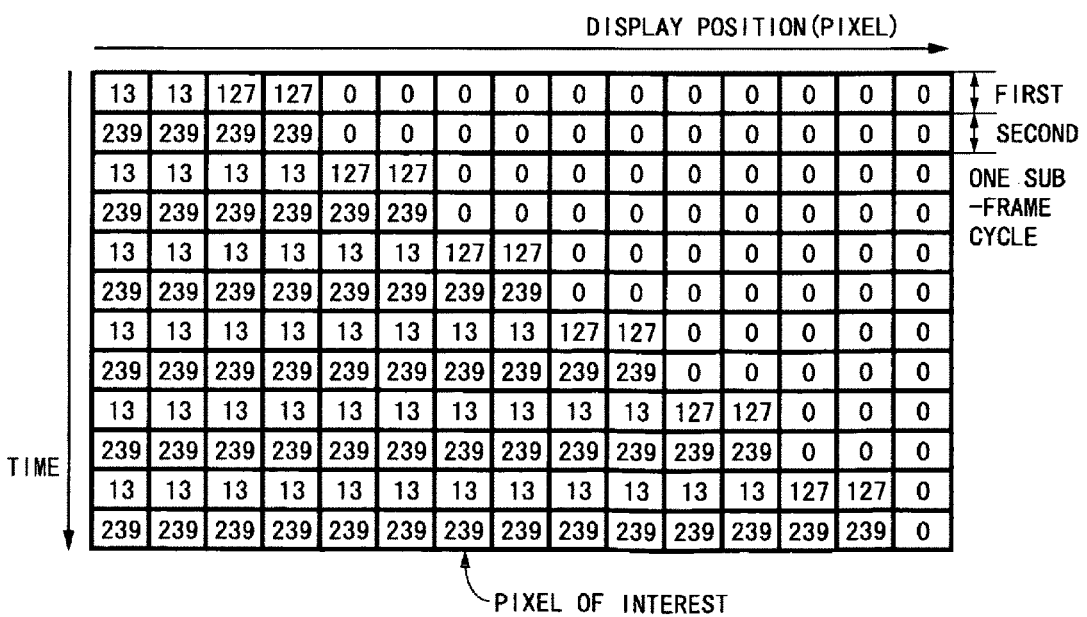
FIG. 22 is a diagram illustrating an exemplary change of an output signal of an overshoot process circuit in the liquid crystal display device shown in FIG. 17.

In the simple double-speed process by the simple double-speed process circuit 30, the same gradation level is outputted during the first and second sub-frames. When the input gradation level changes at a rate of 60 Hz in the order: 0, 0, 170, 170, 170, 170, as shown in FIG. 19, the gradation level after the simple double-speed process changes at a rate of 120 Hz in the order: 0, 0, 0, 0, 170, 170, and so on, as shown in FIG. 20. Processing after the simple double-speed process is approximately the same as in the first embodiment, and therefore only differences from the first embodiment will be described here.

As shown in FIG. 20, the first and second sub-frames are equal in terms of the gradation level after the simple double-speed process. Therefore, the gradation level change detection circuit 70 makes a determination "changed" or "not changed" for the first sub-frame, but as for the second sub-frame, the determination "not changed" is always made. Accordingly, in some cases, the overshoot process circuit 50 might perform the overshoot process for the gradation level of the first sub-frame, but as for the gradation level of the second sub-frame, the overshoot process is not performed. Thus, the overshoot process circuit 50 may only include the first sub-frame LUT as the LUT 52, and the second sub-frame LUT is not necessary.

In this manner, even when using the simple double-speed process circuit 30 in place of the frame interpolation process circuit 20, a pixel of interest in the liquid crystal display device 2 coincides with other pixels around the boundary in terms of the minimum brightness during the first sub-frame and the maximum brightness during the second sub-frame, as in the first embodiment and as shown in FIG. 23. Therefore, for the same reason as in the first embodiment, it is possible to suppress occurrence of any false contour different from a true contour.

As described above, in the liquid crystal display device 2 according to the present embodiment, the simple double-speed process and the time-division gradation drive are performed, and overshoot drive is performed for pixels having their gradation levels changed between consecutive sub-frames. Time-division gradation drive makes it possible to suppress occurrence of any moving image blur, and overshoot drive makes it possible to make up for a lack of response speed of the liquid crystal display elements 91. Accordingly, the liquid crystal display device 2 makes it possible to improve moving image display performance, while making up for the lack of response speed of the display elements.

Third Embodiment

Figure 24:
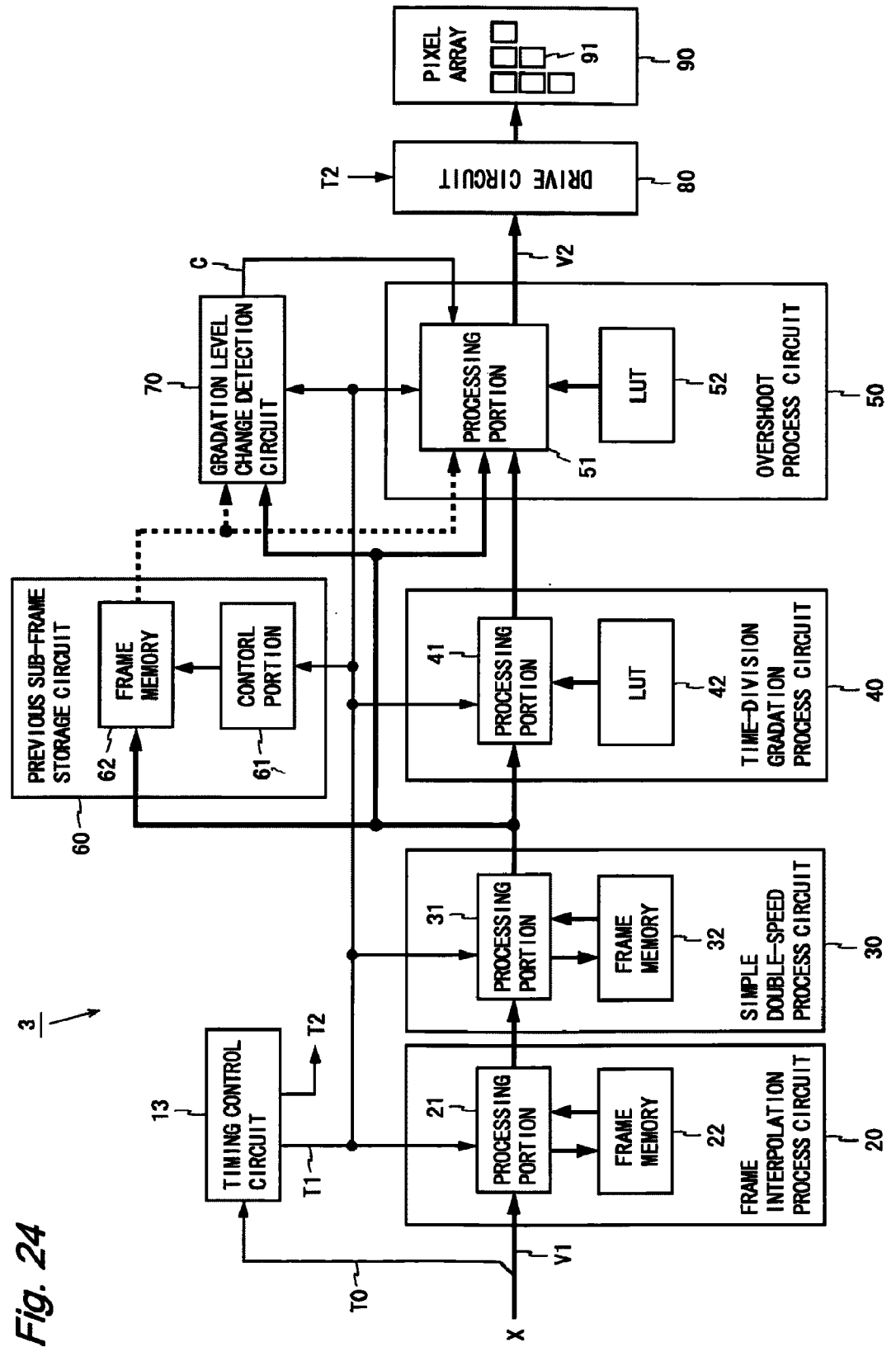
FIG. 24 is a block diagram illustrating the configuration of a liquid crystal display device according to a third embodiment of the present invention.

FIG. 24 is a block diagram illustrating the configuration of a liquid crystal display device 3 according to a third embodiment of the present invention. The liquid crystal display device 3 shown in FIG. 24 includes a timing control circuit 13, a frame interpolation process circuit 20, a simple double-speed process circuit 30, a time-division gradation process circuit 40, an overshoot process circuit 50, a previous sub-frame storage circuit 60, a gradation level change detection circuit 70, a drive circuit 80, and a pixel array 90. The liquid crystal display device 3 performs four processes (a frame interpolation process, a simple double-speed process, a time-division gradation process, and an overshoot process) on a video signal V1, and provides a gradation display using a resultant video signal V2. In the present embodiment, the frame interpolation process circuit 20 and the simple double-speed process circuit 30 constitute a video conversion circuit for obtaining a video signal in units of sub-frames based on a video signal inputted in units of frames.

An input signal X to be supplied to the liquid crystal display device 3 includes the video signal V1 and a synchronization signal T0. The video signal V1 is inputted to the frame interpolation process circuit 20, and the synchronization signal T0 is inputted to the timing control circuit 13. It should be noted that in the liquid crystal display device 3, the video signal V1 has a refresh rate of 50 Hz. Based on the synchronization signal T0, the timing control circuit 13 outputs a synchronization signal T1 to the frame interpolation process circuit 20, the simple double-speed process circuit 30, the time-division gradation process circuit 40, the overshoot process circuit 50, the previous sub-frame storage circuit 60, and the gradation level change detection circuit 70, while outputting a synchronization signal T2 to the drive circuit 80.

Figure 25:
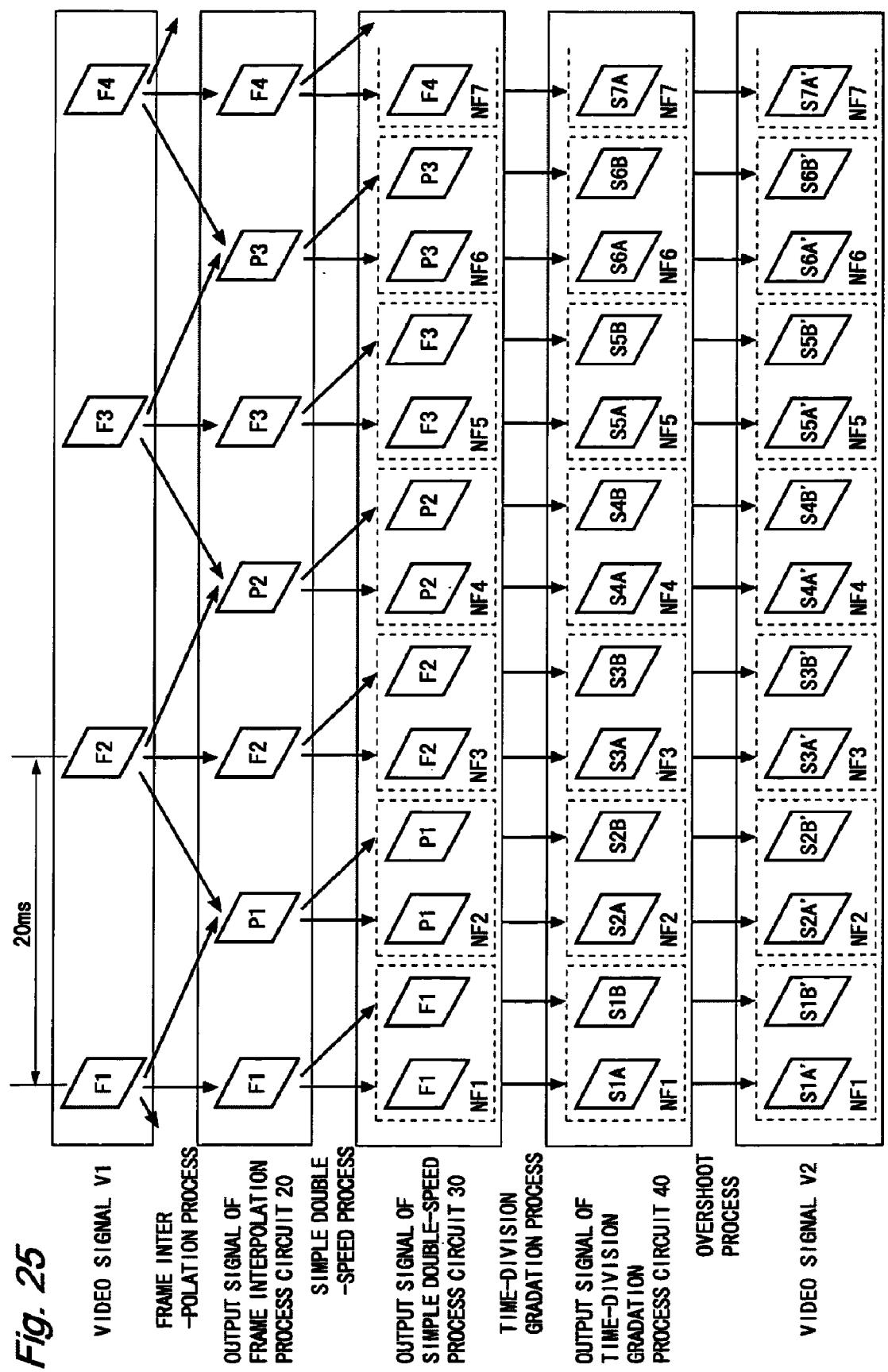
FIG. 25 is a diagram illustrating a frame-by-frame process flow in the liquid crystal display device shown in FIG. 24.

FIG. 25 is a diagram illustrating a frame-by-frame process flow in the liquid crystal display device 3. When the video signal V1 has a refresh rate of 50 Hz, the frame interpolation process circuit 20 receives frames F1, F2, . . . , each being inputted every 20 ms. In the frame interpolation process circuit 20, an interpolation frame P1 is created and interposed between the frames F1 and F2. The interpolation frames P2, P3, and so on, are processed similarly. As a result, a video signal having twice (100 Hz) the refresh rate of the video signal V1 is obtained. As in the second embodiment, a video signal outputted from the frame interpolation process circuit 20 is subjected to the simple double-speed process, the time-division gradation process, and the overshoot process.

Figure 26:
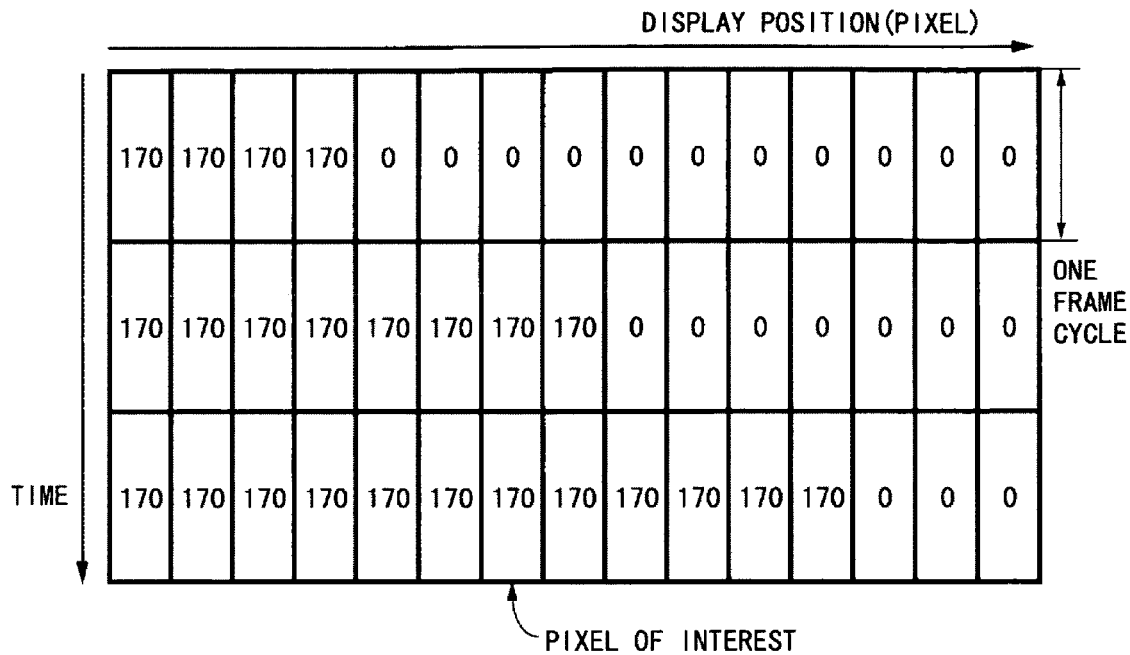
FIG. 26 is a diagram illustrating an exemplary change of a video signal inputted to the liquid crystal display device shown in FIG. 24.
Figure 27:
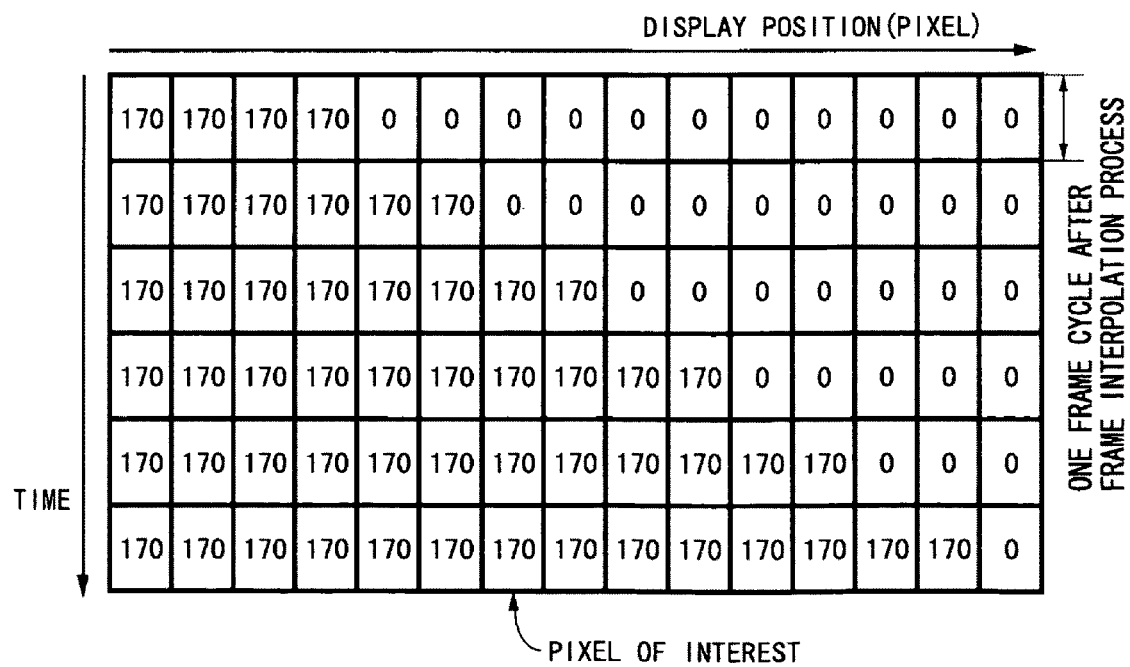
FIG. 27 is a diagram illustrating an exemplary change of an output signal of a frame interpolation process circuit in the liquid crystal display device shown in FIG. 24.

As in the first embodiment, the change in gradation level for each pixel in the liquid crystal display device 3 will be described with respect to the example shown in FIG. 4. Note that, in the present embodiment, the boundary between the two regions is assumed to move horizontally rightward at a rate of four pixels per frame. FIGS. 26 and 27 are diagrams respectively illustrating changes over three frame cycles of the video signal V1 and an output signal of the frame interpolation process circuit 20, in relation to pixels in the line of interest. In the frame interpolation process by the frame interpolation process circuit 20, a motion-compensated frame is created and interposed between previous and current frames. When the input gradation level of a pixel of interest changes at a rate of 50 Hz in the order: 0, 170, 170, as shown in FIG. 26, the gradation level after the frame interpolation process changes at a rate of 100 Hz in the order: 0, 0, 170, 170, 170, 170, as shown in FIG. 27.

Figure 28:
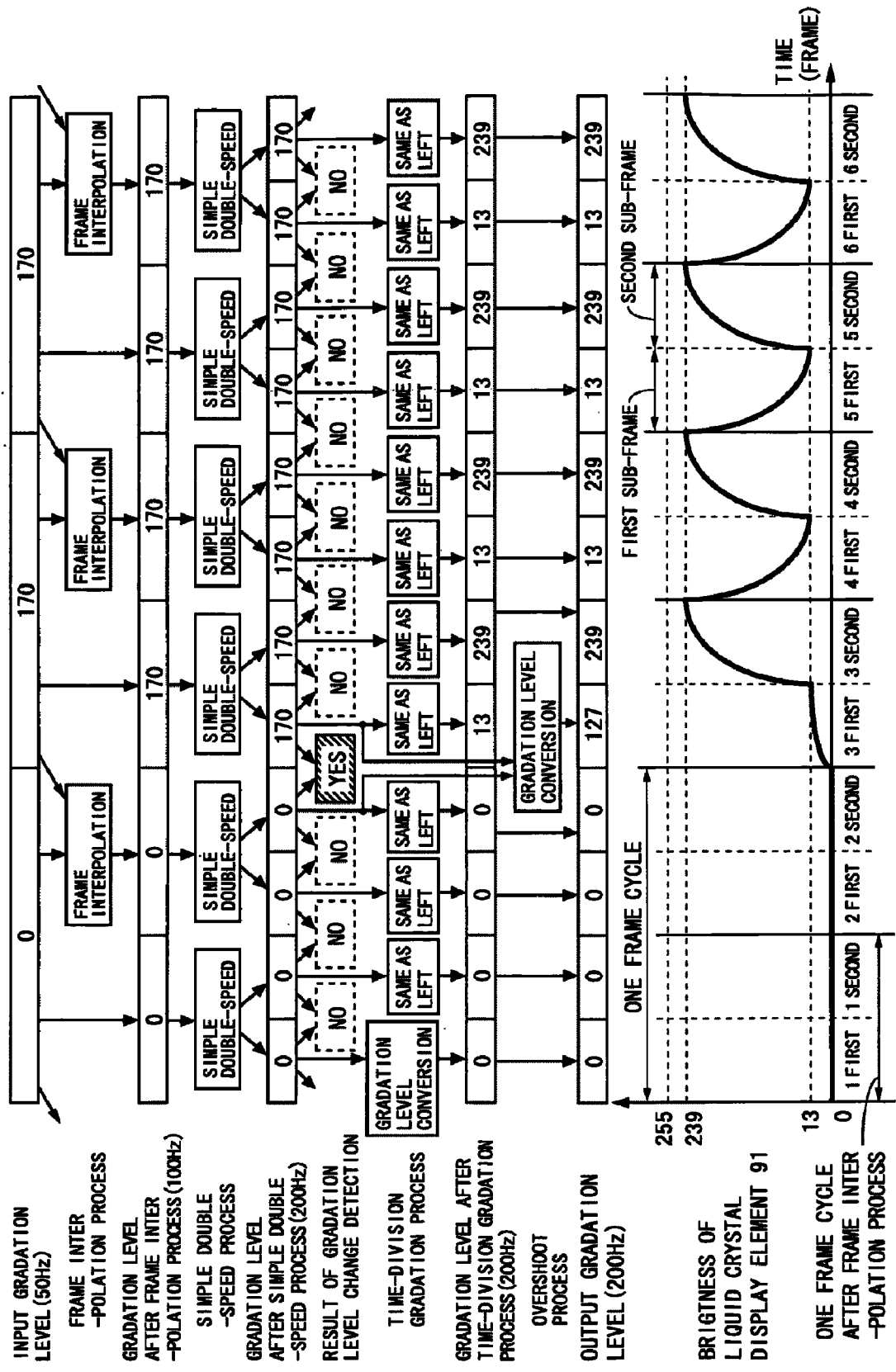
FIG. 28 is a diagram illustrating exemplary changes in gradation level of a video signal and in brightness of a liquid crystal display element, in relation to a pixel in the liquid crystal display device shown in FIG. 24.

FIG. 27 is the same as FIG. 19 if one frame cycle after the frame interpolation process in FIG. 27 is considered as one frame cycle in FIG. 19. Accordingly, as for the liquid crystal display device 3, changes over three frame cycles of the output signal of the simple double-speed process circuit 30, the output signal of the time-division gradation process circuit 40, and the video signal V2 are shown in the same manner as in FIGS. 20 to 22. FIG. 28 is a diagram illustrating changes over three frame cycles in gradation level of the video signal and in brightness of the liquid crystal display element 91, in relation to the pixel of interest.

In this manner, even when using both the frame interpolation process circuit 20 and the simple double-speed process circuit 30, a pixel of interest in the liquid crystal display device 3 coincides with other pixels around the boundary in terms of the minimum brightness during the first sub-frame and the maximum brightness during the second sub-frame, as in the first embodiment and as shown in FIG. 28. Therefore, for the same reason as in the first embodiment, it is possible to suppress occurrence of any false contour different from a true contour.

As described above, in the liquid crystal display device 3 according to the present embodiment, frame interpolation drive, the simple double-speed process, and time-division gradation drive are performed, and overshoot drive is performed for pixels having their gradation levels changed between consecutive sub-frames. Frame interpolation drive and time-division gradation drive make it possible to suppress occurrence of any moving image blur, and overshoot drive makes it possible to make up for a lack of response speed of the liquid crystal display elements 91. Accordingly, the liquid crystal display device 3 makes it possible to improve moving image display performance, while making up for the lack of response speed of the display elements.

Fourth Embodiment

Figure 29:
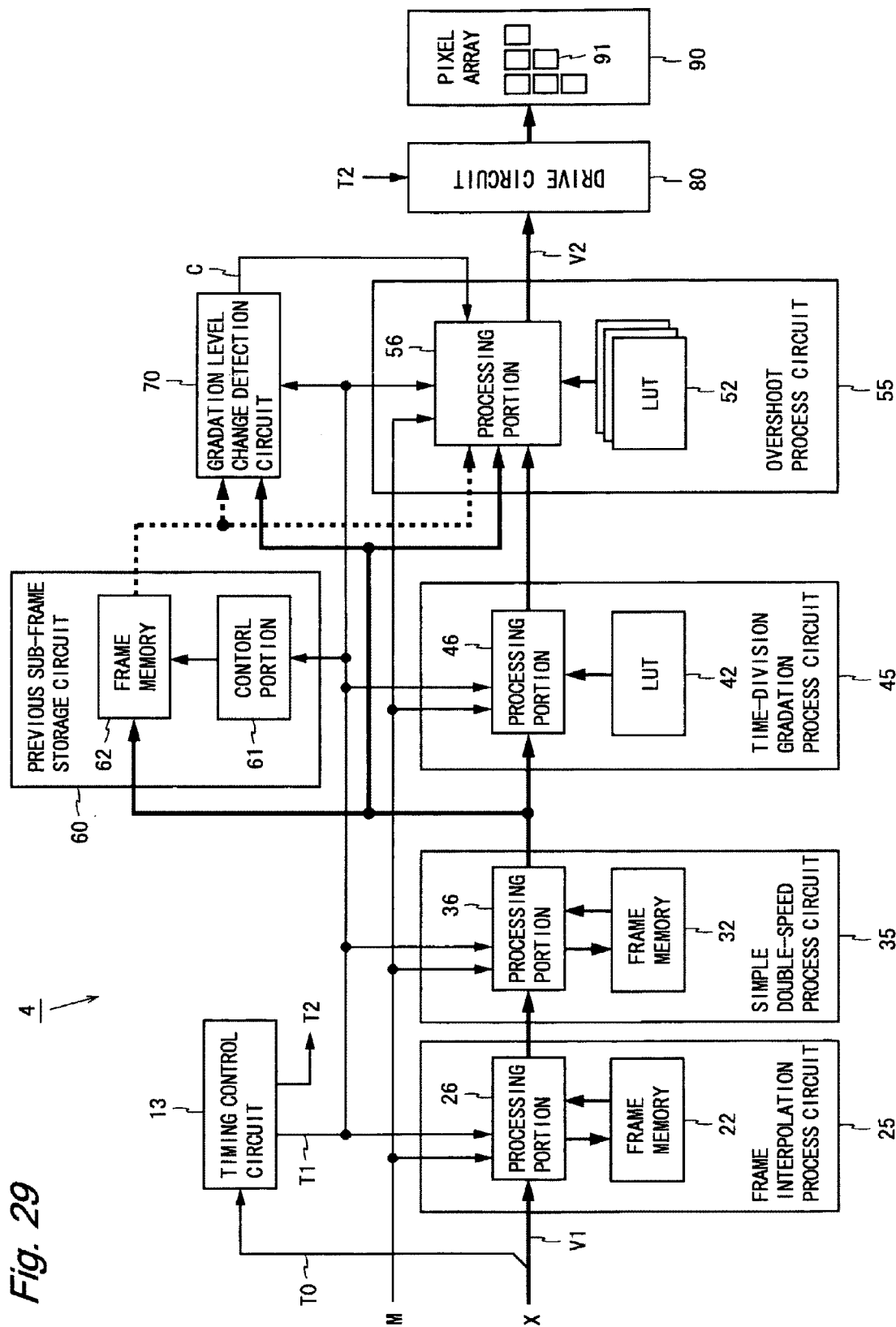
FIG. 29 is a block diagram illustrating the configuration of a liquid crystal display device according to a fourth embodiment of the present invention.
Figure 30:
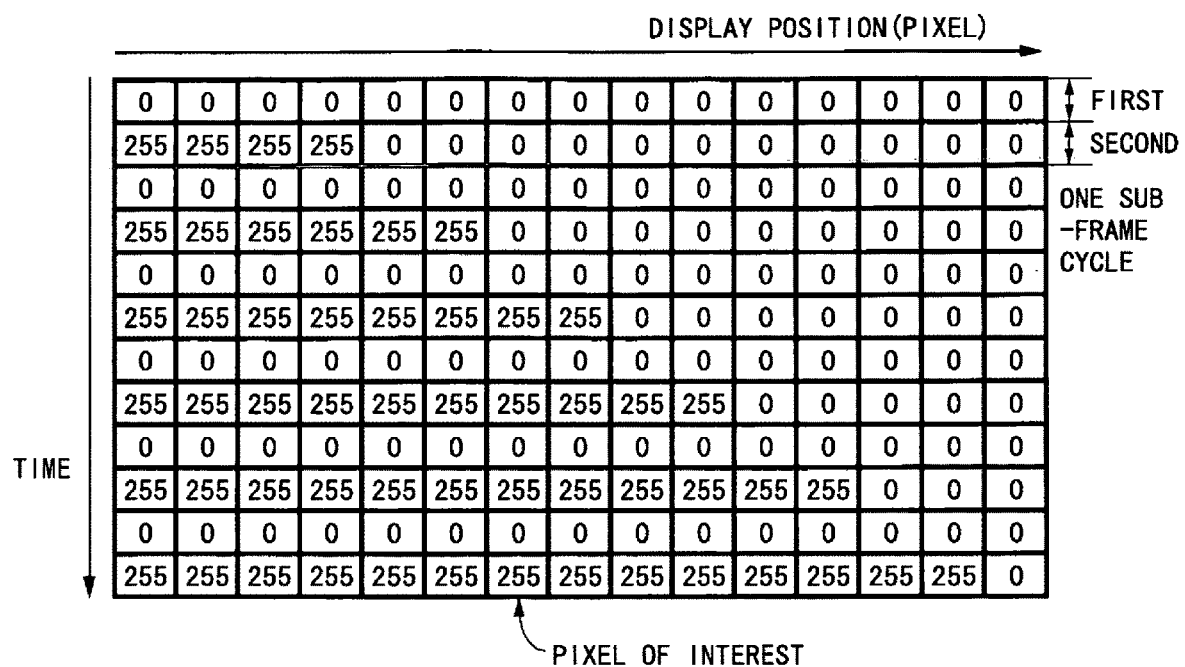
FIG. 30 is a diagram illustrating an exemplary change of a video signal inputted to a conventional image display device.
Figure 31:
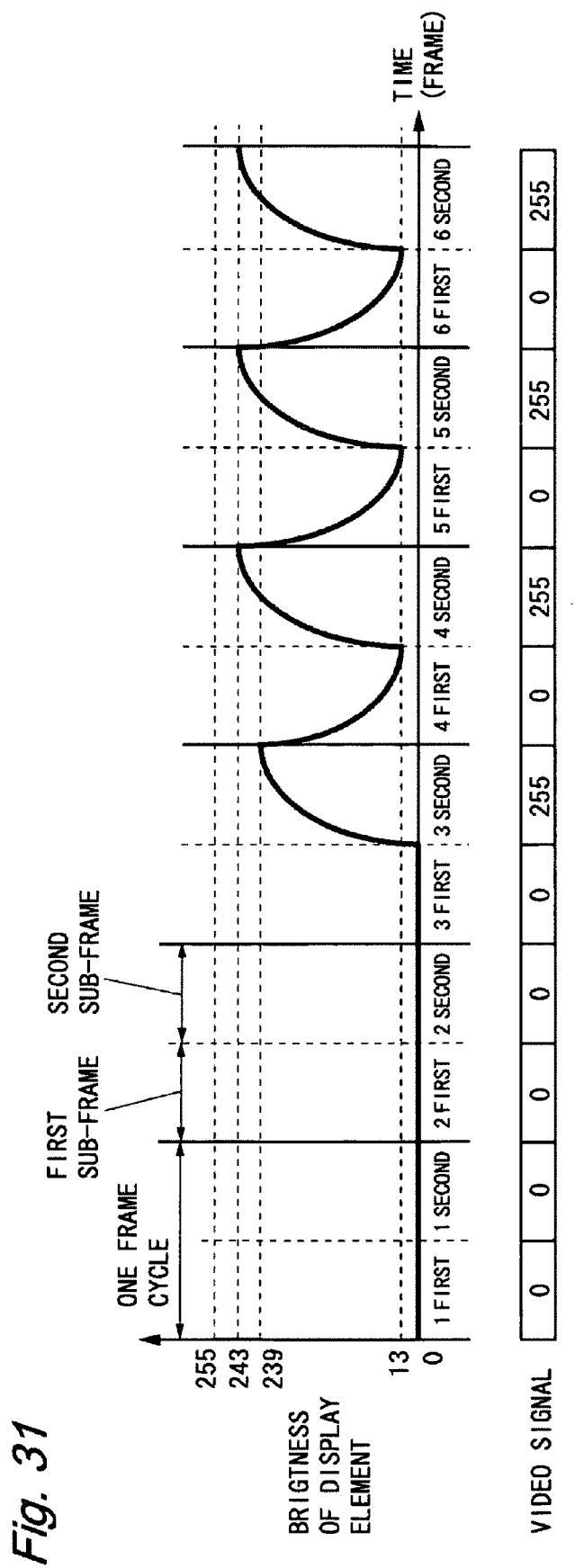
FIG. 31 is a diagram illustrating exemplary changes in gradation level of a video signal provided to a display element and in brightness of the display element in the conventional image display device.

FIG. 29 is a block diagram illustrating the configuration of a liquid crystal display device 4 according to a fourth embodiment of the present invention. The liquid crystal display device 4 shown in FIG. 29 includes a timing control circuit 13, a frame interpolation process circuit 25, a simple double-speed process circuit 35, a time-division gradation process circuit 45, an overshoot process circuit 55, a previous sub-frame storage circuit 60, a gradation level change detection circuit 70, a drive circuit 80, and a pixel array 90. The liquid crystal display device 4 performs selected one or more of three processes (a frame interpolation process, a simple double-speed process, and a time-division gradation process), along with an overshoot process, on a video signal V1, and displays a screen based on a resultant video signal V2. In the present embodiment, the frame interpolation process circuit 25 and the simple double-speed process circuit 35 constitute a video conversion circuit for obtaining a video signal in units of sub-frames based on a video signal inputted in units of frames.

The liquid crystal display device 4 is provided with a mode switching signal M, along with an input signal X including the video signal V1 and a synchronization signal T0. The mode switching signal M is a control signal for independently switching between performing and not performing the three processes on the video signal. It should be noted that in the liquid crystal display device 4, the video signal V1 has a refresh rate of 60 Hz.

The frame interpolation process circuit 25 includes a processing portion 26 and a frame memory 22. The processing portion 26 is obtained by providing the processing portion 21 according to the first embodiment with an additional function of switching between performing and not performing the frame interpolation process in accordance with the mode switching signal M. The simple double-speed process circuit 35 includes a processing portion 36 and a frame memory 32. The processing portion 36 is obtained by providing the processing portion 31 according to the second embodiment with an additional function of switching between performing and not performing the simple double-speed process in accordance with the mode switching signal M. The time-division gradation process circuit 45 includes a processing portion 46 and an LUT 42. The processing portion 46 is obtained by providing the processing portion 41 according to the first embodiment with an additional function of switching between performing and not performing the time-division gradation process in accordance with the mode switching signal M. When performing no process on the video signal, the processing portions 26, 36, and 46 output the video signal inputted thereto without modification.

The overshoot process circuit 55 includes a processing portion 56 and a plurality of LUTs 52. The processing portion 56 is obtained by providing the processing portion 51 according to the first embodiment with an additional function of selecting an LUT 52 to be used for gradation level conversion from among the LUTs 52, in accordance with the mode switching signal M.

The frame interpolation process circuit 25, the simple double-speed process circuit 35, and the time-division gradation process circuit 45 each switch between processing and not processing the video signal in accordance with the mode switching signal M, and the overshoot process circuit 55 changes the contents of the gradation level conversion in accordance with the mode switching signal M.

For example, when the mode switching signal M takes a first value, the frame interpolation process circuit 25 and the time-division gradation process circuit 45 perform their processes, but the simple double-speed process circuit 35 does not perform its process. In this case, the liquid crystal display device 4 operates in the same manner as the liquid crystal display device 1 according to the first embodiment. In addition, when the mode switching signal M takes a second value, the simple double-speed process circuit 35 and the time-division gradation process circuit 45 perform their processes, but the frame interpolation process circuit 25 does not perform its process. In this case, the liquid crystal display device 4 operates in the same manner as the liquid crystal display device 2 according to the second embodiment. In addition, when the mode switching signal M takes a third value, the frame interpolation process circuit 25, the simple double-speed process circuit 35, and the time-division gradation process circuit 45 perform their processes. In this case, the liquid crystal display device 4 operates in the same manner as the liquid crystal display device 3 according to the third embodiment. In addition, when the mode switching signal M takes a fourth value, the frame interpolation process circuit 25 performs its process, but the simple double-speed process circuit 35 and the time-division gradation process circuit 45 do not perform their processes. In this case, the liquid crystal display device 4 performs frame interpolation drive and overshoot drive.

As described above, the liquid crystal display device 4 according to the present embodiment switches between performing or not performing any of the processes on the video signal, and changes the contents of the gradation level conversion by the overshoot process circuit 55, in accordance with a control signal. Accordingly, it is possible to change the mode of driving the display elements based on the control signal. In addition, the overshoot process circuit 55 is provided for performing a different type of gradation level conversion in accordance with the control signal, and therefore it is possible to eliminate the need to provide an overshoot process circuit for each drive mode, resulting in a reduction in the cost of the image display device.

Note that the liquid crystal display devices according to the first to fourth embodiments have been described as including the simple double-speed process circuit and the frame interpolation process circuit for doubling the refresh rate of the video signal, but instead of including them, they may include a simple M-times higher speed process circuit (a predetermined-times higher speed process circuit) for increasing the refresh rate of the video signal by M-fold, and a frame interpolation process circuit for increasing the refresh rate of the video signal by N-fold.

Also, the frame interpolation process circuit, the simple M-times higher speed process circuit, and the previous sub-frame storage circuit may independently include an individual frame memory, or they may share one frame memory. Moreover, the frame interpolation process circuit may obtain a motion vector based on previous and subsequent frames, and create an interpolation frame based on the obtained motion vector, or it may create an interpolation frame by any other method.

Also, the display mode of the liquid crystal display device may be a VA (vertically aligned) mode, an IPS (in-plane switching) mode, an OCB (optically-compensated birefringence) mode, a TN (twisted nematic) mode, or any other mode. Moreover, electroluminescence elements may be used as display elements to configure an electroluminescence display device.

As with the liquid crystal display devices according to the first to fourth embodiments, these liquid crystal display devices and the image display device also make it possible to improve moving image display performance, while making up for a lack of response speed of the display elements.

Also, by combining the above-described image display device with a signal input portion for outputting an externally provided video signal to the image display device, it becomes possible to configure an image display monitor (e.g., a liquid crystal monitor) for use in a personal computer or suchlike, and by combining the above-described image display device with a tuner portion for selecting a television broadcast signal channel and outputting a television image signal for the selected channel to the image display device, it becomes possible to configure a television receiver (e.g., a liquid crystal television receiver). Thus, it is possible to provide image display monitors and television receivers capable of improving moving image display performance, while making up for a lack of response speed of display elements.

INDUSTRIAL APPLICABILITY

The image display device of the present invention makes it possible to improve moving image display performance, while making up for a lack of response speed of display elements, and therefore can be used as any of various image display devices, such as a liquid crystal display device or an electroluminescence display device.

The invention claimed is:
1. An image display device for providing a gradation display based on a video signal, comprising:
 a plurality of display elements;
 a drive circuit for driving the display elements;
 a video conversion circuit for obtaining a video signal in units of sub-frames based on a video signal inputted in units of frames;
 a time-division gradation process circuit for performing gradation level conversion on a video signal outputted from the video conversion circuit to distribute brightness for one frame cycle to a plurality of sub-frame cycles;
 a gradation level change detection circuit for detecting whether a gradation level of each pixel has been changed between consecutive sub-frames for the video signal outputted from the video conversion circuit; and
 an overshoot process circuit for outputting to the drive circuit a video signal obtained by subjecting a video signal outputted from the video conversion circuit, instead of a video signal outputted from the time-division gradation process circuit, regarding any pixel detected by the gradation level change detection circuit to have its gradation level changed, the gradation level conversion being performed in order to distribute brightness for one frame cycle to a plurality of sub-frame cycles while emphasizing a temporal change of the signal.
2. The image display device according to claim 1, wherein the video conversion circuit includes a frame interpolation process circuit for performing an interpolation process on the input video signal in units of frames.

3. The image display device according to claim 2, wherein,
the video conversion circuit includes one or more video processing circuits for processing the video signal,
the video processing circuit and the time-division gradation process circuit switch between processing and not processing the video signal in accordance with a control signal, and
the overshoot process circuit performs a different type of gradation level conversion in accordance with the control signal.

4. The image display device according to claim 1, wherein the video conversion circuit includes a predetermined-times higher speed process circuit for outputting the input video signal a plurality of times in units of frames.

5. The image display device according to claim 4, wherein,
the video conversion circuit includes one or more video processing circuits for processing the video signal,
the video processing circuit and the time-division gradation process circuit switch between processing and not processing the video signal in accordance with a control signal, and
the overshoot process circuit performs a different type of gradation level conversion in accordance with the control signal.

6. The image display device according to claim 1, wherein the video conversion circuit includes:
a frame interpolation process circuit for performing an interpolation process on the input video signal in units of frames; and
a predetermined-times higher speed process circuit for outputting a video signal outputted from the frame interpolation process circuit a plurality of times in units of frames.

7. The image display device according to claim 6, wherein,
the video conversion circuit includes one or more video processing circuits for processing the video signal,
the video processing circuit and the time-division gradation process circuit switch between processing and not processing the video signal in accordance with a control signal, and
the overshoot process circuit performs a different type of gradation level conversion in accordance with the control signal.

8. The image display device according to claim 1, wherein,
the video conversion circuit includes one or more video processing circuits for processing the video signal,
the video processing circuit and the time-division gradation process circuit switch between processing and not processing the video signal in accordance with a control signal, and
the overshoot process circuit performs a different type of gradation level conversion in accordance with the control signal.

9. The image display device according to claim 1, wherein the overshoot process circuit performs gradation level conversion differently on each sub-frame within one frame.

10. The image display device according to claim 9, wherein the gradation level change detection circuit outputs a signal indicating for each pixel whether a gradation level has changed between consecutive sub-frames by a predetermined value or more.

11. The image display device according to claim 9, wherein the overshoot process circuit includes a look-up table and an arithmetic circuit, the look-up table having stored therein a post-conversion gradation level corresponding to a representative value, the arithmetic circuit calculating a post-conversion gradation level corresponding to a value other than the representative value.

12. The image display device according to claim 11, wherein,
the overshoot process circuit performs processes on the video signal outputted from the video conversion circuit in order to distribute brightness for one cycle to two sub-frame cycles, one of the processes being performed for a gradation level below a predetermined value to achieve a constant post-conversion gradation level for the first sub-frame and a variable post-conversion gradation level for the second sub-frame, the other being performed for a gradation level at or above the predetermined value to achieve a constant post-conversion gradation level for the second sub-frame and a variable post-conversion gradation level for the first sub-frame, and
the representative value includes a gradation level at a boundary for switching between the two processes.

13. The image display device according to claim 9, wherein,
where maximum reachable brightness value is set as brightness of the display elements after one sub-frame cycle since a gradation level of a video signal provided to the display elements changed from minimum to maximum, and minimum reachable brightness value is set as brightness of the display elements after one sub-frame cycle since the gradation level of the video signal provided to the display elements changed from maximum to minimum,
the time-division gradation process circuit outputs a value between the minimum reachable brightness value and the maximum reachable brightness value as a post-conversion gradation level when a gradation level of the video signal outputted from the video conversion circuit is between the minimum reachable brightness value and the maximum reachable brightness value.

14. The image display device according to claim 13, wherein the time-division gradation process circuit outputs a pre-conversion gradation level as the post-conversion gradation level when the gradation level of the video signal outputted from the video conversion circuit is less than the minimum reachable brightness value or greater than the maximum reachable brightness value.

15. The image display device according to claim 9, wherein the display elements have a response speed slower than a speed corresponding to one sub-frame cycle.

16. The image display device according to claim 15, wherein the display elements are liquid crystal display elements.

17. The image display device according to claim 15, wherein the display elements are electroluminescence elements.

* * * * *